US012328248B2

(12) United States Patent
Zhuang et al.

(10) Patent No.: US 12,328,248 B2
(45) Date of Patent: Jun. 10, 2025

(54) INFORMATION REPORTING METHOD, INFORMATION PROCESSING METHOD, AND DEVICE

(71) Applicant: Huawei Technologies Co., Ltd., Shenzhen (CN)

(72) Inventors: Shunwan Zhuang, Beijing (CN); Haibo Wang, Beijing (CN); Yunan Gu, Beijing (CN); Gang Yan, Beijing (CN); Zhenbin Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 369 days.

(21) Appl. No.: 17/744,098

(22) Filed: May 13, 2022

(65) Prior Publication Data

US 2022/0272025 A1    Aug. 25, 2022

Related U.S. Application Data

(63) Continuation of application No. PCT/CN2020/128260, filed on Nov. 12, 2020.

(30) Foreign Application Priority Data

Nov. 15, 2019   (CN) .......................... 201911120618.0

(51) Int. Cl.
*H04L 12/66*     (2006.01)
*H04L 45/00*     (2022.01)
(Continued)

(52) U.S. Cl.
CPC .................................. *H04L 45/04* (2013.01)

(58) Field of Classification Search
CPC ......... H04L 45/02; H04L 45/04; H04L 67/10; H04L 45/021; H04L 45/42; H04W 72/04; H04W 72/569; H04W 72/23; H04W 72/21
See application file for complete search history.

(56) References Cited

U.S. PATENT DOCUMENTS 7,633,874 B1 *  12/2009  Nalawade ............... H04L 45/04
                                                          370/254
9,106,530 B1 *   8/2015  Wang ..................... H04L 45/033
(Continued)

FOREIGN PATENT DOCUMENTS

| CN | 105281942 A | 1/2016 |
| CN | 105847158 A | 8/2016 |

(Continued)

OTHER PUBLICATIONS

Zhuang, S. et al., "Monitoring BGP Parameters Using BMP", INetwork Working Group, nternet Draft, Nov. 4, 2019, 8 pages.
(Continued)

*Primary Examiner* — Sai Aung
(74) *Attorney, Agent, or Firm* — Slater Matsil, LLP

(57) ABSTRACT

Embodiments of this application disclose an information reporting method, an information processing method, and a device. According to the information reporting method, a network device obtains Border Gateway Protocol (BGP) information of a network device. The network device sends a BGP Monitoring Protocol (BMP) notification message to a first device, where the BMP notification message carries the BGP information of the network device.

19 Claims, 20 Drawing Sheets

(51) Int. Cl.
*H04L 45/02* (2022.01)
*H04L 45/74* (2022.01)

(56) References Cited

U.S. PATENT DOCUMENTS

| | | | |
|---|---|---|---|
| 9,137,116 B1* | 9/2015 | Rijsman | H04L 67/10 |
| 2005/0198269 A1 | 9/2005 | Champagne et al. | |
| 2006/0171404 A1* | 8/2006 | Nalawade | H04L 45/563 |
| | | | 370/428 |
| 2007/0206587 A1* | 9/2007 | Ramaiah | H04L 45/033 |
| | | | 370/389 |
| 2012/0263049 A1 | 10/2012 | Venkatachalpathy et al. | |
| 2016/0226760 A1 | 8/2016 | Lijenstolpe et al. | |
| 2017/0134308 A1* | 5/2017 | Zhuang | H04L 41/0853 |
| 2017/0374174 A1 | 12/2017 | Evens et al. | |
| 2018/0367388 A1* | 12/2018 | Pani | H04L 41/0895 |
| 2018/0367449 A1* | 12/2018 | Pani | H04L 41/0686 |
| 2019/0034472 A1 | 1/2019 | Evens et al. | |
| 2019/0372858 A1* | 12/2019 | Krishnamurthy | H04L 41/145 |

FOREIGN PATENT DOCUMENTS

| | | |
|---|---|---|
| CN | 106059793 A | 10/2016 |
| CN | 106059916 A | 10/2016 |
| CN | 106059934 A | 10/2016 |
| CN | 106161256 A | 11/2016 |
| CN | 106169978 A | 11/2016 |
| CN | 106254251 A | 12/2016 |
| CN | 106375353 A | 2/2017 |
| CN | 106470187 A | 3/2017 |
| CN | 106506376 A | 3/2017 |
| CN | 108123848 A | 6/2018 |
| CN | 108134707 A | 6/2018 |
| CN | 108259324 A | 7/2018 |
| CN | 109246008 A | 1/2019 |
| CN | 110191059 A | 8/2019 |
| WO | 2016123928 A1 | 8/2016 |
| WO | 2016177131 A1 | 11/2016 |
| WO | 2016177184 A1 | 11/2016 |
| WO | 2017031984 A1 | 3/2017 |
| WO | 2017036163 A1 | 3/2017 |
| WO | 2017036165 A1 | 3/2017 |

OTHER PUBLICATIONS

Rekhter, Y. et al., A Border Gateway Protocol 4 (BGP-4), Request for Comments: 4271, Network Working Group, Jan. 2006, 104 pages.

Marques, P. et al., "Dissemination of Flow Specification Rules", Request for Comments: 5575, Network Working Group, Aug. 2009, 22 pages.

Scudder, J. et al., "BGP Monitoring Protocol (BMP)", Internet Engineering Task Force (IETF), Request for Comments: 7854, Jun. 2016, 27 pages.

Evens, T. et al., "Support for Local RIB in BGP Monitoring Protocol (BMP) draft-ietf-grow-bmp-local-rib-00," Global Routing Operations, Internet-Draft, Updates: 7854 (if approved), Intended Status: Standards Track, Expires: Dec. 11, 2017, XP015120068, Jun. 9, 2017, 14 pages.

Scudder, J. et al., "BGP Monitoring Protocol draft-ietf-grow-bmp-17," Network Working Group, Internet-Draft, Intended Status: Standards Track, Expires: Jul. 16, 2016, XP055783865, Jan. 13, 2016, 26 pages.

* cited by examiner

INFORMATION REPORTING METHOD, INFORMATION PROCESSING METHOD, AND DEVICE

CROSS-REFERENCE TO RELATED APPLICATIONS

This application is a continuation of International Application No. PCT/CN2020/128260, filed on Nov. 12, 2020, which claims priority to Chinese Patent Application No. 201911120618.0, filed on Nov. 15, 2019. The disclosures of the aforementioned applications are hereby incorporated by reference in their entireties.

TECHNICAL FIELD

This application relates to the communications field, and in particular, to an information reporting method, an information processing method, and a device.

BACKGROUND

The Border Gateway Protocol (BGP) is a dynamic routing protocol used between autonomous systems (AS). BGP uses the Transmission Control Protocol (TCP) as a transmission layer protocol to improve reliability of the protocol. A network architecture to which BGP is applied generally includes a BGP speaker. The BGP speaker receives or generates routing information, and sends the routing information to other BGP speakers. BGP speakers that exchange routing information are mutually referred to as peers.

With increasing demand for high network reliability, it is very important to ensure normal running of the speakers. Traditionally, BGP information of a speaker is mainly monitored manually, that is, an operator manually enters an information query command to obtain the BGP information of the corresponding speaker. However, in this manner, not only labor costs are high, but also efficiency is low. Therefore, an automated manner is urgently required to replace manual obtaining of BGP information.

SUMMARY

Embodiments of this application provide an information reporting method, an information processing method, and a device, to improve efficiency of obtaining BGP information and reduce costs.

According to a first aspect, an embodiment of this application provides an information reporting method. The method may be applied to a network device, such as a router or a switch. The method includes the following steps: First, the network device obtains BGP information of the network device. In this embodiment of this application, the BGP information may include one or more of address family monitoring information of the network device, resource information of the network device, health status information of the network device, security state information of the network device, and the like. The address family monitoring information of the network device is information for monitoring an address family, and is used to ensure normal running of the address family. The resource information of the network device is information indicating resources of the network device, and reflects a load status of the network device. The health status information of the network device is information indicating a health status of the network device, and reflects whether the network device is faulty. The security state information of the network device is information indicating a security state of the network device, and reflects whether the network device has a potential security risk. Then the network device sends a BGP Monitoring Protocol (BMP) notification message to a first device, where the BMP notification message carries the BGP information of the network device. Specifically, the BGP information of the network device may be carried in a type-length-value (TLV) field of the BMP notification message. In this embodiment of this application, the network device adds the BGP information to the BMP notification message and reports the BMP notification message to the first device, so that the first device automatically obtains the BGP information and performs corresponding subsequent processing, thereby improving efficiency of obtaining the BGP information and reducing corresponding costs. In this embodiment of this application, the first device may be a server or a terminal device that runs a BMP service (server) function.

The following describes the BGP information in detail.

In this embodiment of this application, the address family monitoring information of the network device may be carried in a BGP Monitoring Update TLV field. Specifically, the address family monitoring information of the network device may include address family information and a first indication. The address family information may include an address family identifier (AFI), or may include an address family identifier and a subsequent address family identifier (SAFI). The address family identifier is used to identify the address family; and the subsequent address family identifier is used to identify a subsequent address family of the address family. The first indication is used t0 indicate whether monitoring is enabled for the address family corresponding to the address family information. The network device reports the address family information and the first indication to the first device, so that the first device can know a configuration of whether to monitor the address family corresponding to the address family information, determine whether the network device correctly configures the address family information, or the like. In this embodiment of this application, the configuration of the address family information by the network device is used to establish a BGP session corresponding to the address family information. If the configuration is correct, the BGP session can be established. If the configuration is incorrect, the BGP session cannot be established.

Specifically, the address family monitoring information of the network device further includes a configuration state corresponding to the address family information, and the configuration state is a state about whether the network device and/or a peer of the network device have/has configured the address family information. The configuration state may be a first configuration state, a second configuration state, or a third configuration state. The first configuration state indicates that both the network device and the peer of the network device have configured the address family information; the second configuration state indicates that the network device has configured the address family information, and that the peer of the network device has not configured the address family information; and the third configuration state indicates that the network device has not configured the address family information. The second configuration state and the third configuration state indicate that the address family information is incorrectly configured. Which type of processing is performed by the first device on the three configuration states is described subsequently. Details are not described herein.

Optionally, the BGP information of the network device further includes a routing information type, and the routing information type is a routing information type corresponding to the address family information. The routing information type may include pre-policy routing information and/or post-policy routing information, for monitoring the address family of the specific routing information type.

In this embodiment of this application, the resource information of the network device may include resource usage information and/or resource quota information of the network device. The resource usage information indicates resource usage of the network device. The resource quota information indicates a maximum quantity of resources supported or allowed to be used by the network device. The resource information of the network device may be carried in a BGP resource usage TLV field.

For example, the resource information of the network device may include at least one or more of the following: a quantity of BGP sessions used by the network device and/or a total quantity of BGP sessions supported by the network device; a quantity of BGP instances used by the network device and/or a total quantity of BGP instances supported by the network device; a quantity of BGP routing entries used by the network device and/or a total quantity of BGP routing entries supported by the network device; a quantity of routing entries corresponding to address family information configured by the network device; a quantity of forwarding entries in the network device and/or a total quantity of forwarding entries supported by the network device; a quantity of forwarding entries corresponding to the address family information configured by the network device; a memory size used by the network device and/or a total memory size of the network device; and a used memory size corresponding to the address family information configured by the network device.

In this embodiment of this application, the health status information of the network device may be carried in a BGP health update TLV field. For example, the health status information of the network device may include at least one or more of the following: message backlog information of a message queue of the network device and information about a slow peer corresponding to the address family information configured by the network device.

The message backlog information indicates a message backlog in the message queue, and is used to determine whether a speed of inputting and/or outputting a BGP packet on the network device is normal. In a possible implementation, the message backlog information includes a quantity of messages in the message queue and/or a maximum quantity of messages allowed by the message queue.

A slow peer, also referred to as a slow neighbor, means that when a BGP update group includes a plurality of peers, if the network device sends routing information to one of the peers at a low speed due to network congestion or the like, a speed at which the network device sends routing information to another peer in the packet group is further affected, and in this case, the peer is referred to as a slow peer. In this embodiment of this application, the information about the slow peer may include at least one or more of the following: an address of the slow peer, the number of times that the peer corresponding to the address family information is recognized as the slow peer, a start time at which the peer corresponding to the address family information is recognized as the slow peer, and an end time at which the peer corresponding to the address family information is recognized as the slow peer.

In this embodiment of this application, the security state information of the network device may be carried in a BGP security state TLV field. Specifically, the security state information of the network device includes at least one or more of the following: whether a generalized time to live security mechanism (GTSM) is enabled for a BGP session of the network device, where if the GTSM is enabled for the BGP session of the network device, the security state information of the network device further includes a valid time to live (TTL) hop count; whether security authentication is enabled for the BGP session of the network device, where if security authentication is enabled for the BGP session of the network device, the security state information of the network device further includes an authentication mode and/or an authentication algorithm of the security authentication; whether origin authentication is enabled for the BGP session of the network device, where if origin authentication (OV) is enabled for the BGP session of the network device, the security state information of the network device further includes invalid routing prefix information; a quantity of routing prefixes received by the network device and/or a threshold for routing prefixes allowed to be received by the network device; a quantity of routing prefixes corresponding to the address family information and/or a routing prefix threshold corresponding to the address family information; address family information of the network device for which no routing prefix threshold is set; whether the network device enables an error update message ignore function; whether the network device enables an error update message ignore function corresponding to the address family information; whether the network device enables a function of checking a first autonomous system AS number of an autonomous system path (AS_Path) attribute in an update message sent by an External Border Gateway Protocol (EBGP) peer to the network device; whether the network device allows a local autonomous system number to repeatedly appear for a plurality of times; whether the network device configures a corresponding inbound policy and/or outbound policy for the address family; and whether the network device enables secure socket layer (SSL) authentication.

According to a second aspect, an embodiment of this application further provides an information processing method. The method may be applied to a first device. The method specifically includes the following steps: First, the first device receives a BMP notification message from a network device, where the BMP notification message includes BGP information of the network device. For details about the BGP information, refer to the foregoing description. Details are not described herein again. Then the first device performs corresponding processing based on the BGP information of the network device, to ensure normal running of the network device. In this embodiment of this application, the BMP notification message is used to carry the BGP information, so that the first device can automatically obtain the BGP information and perform corresponding processing, thereby improving efficiency of obtaining the BGP information and reducing costs.

The following describes a processing manner of the first device and an achieved effect with reference to the specific BGP information mentioned above.

In a first possible implementation, the BGP information of the network device includes address family monitoring information. When the address family monitoring information includes address family information and a first indication, the first device may display or notify the address family information and the first indication to related personnel by using a short message, an email, or the like, so that the related personnel know for which address family information monitoring needs to be enabled by the network device and for which address family information monitoring needs to be disabled, and then perform corresponding determining processing.

Optionally, the address family monitoring information of the network device may further include a routing information type. Similarly, the first device may display or notify the address family information, the first indication, and the routing message type to the related personnel by using a short message, an email, or the like, so that the related personnel know for which type of routing message of which address family information monitoring needs to be enabled by the network device and for which type of routing message of which address family information monitoring needs to be disabled, and then perform corresponding determining processing.

When the address family monitoring information further includes a configuration state corresponding to the address family information, the first device may detect, based on the address family information, the first indication, and the configuration state, whether the network device is faulty. Specifically, the configuration state is a first configuration state, a second configuration state, or a third configuration state. When the BMP notification message received by the first device includes that a first indication corresponding to a piece of address family information is monitoring enabled, and a corresponding configuration state is the first configuration state, that is, both the network device and a peer have configured the address family information, if the first device can receive a route monitoring (RM) message corresponding to the address family information, it indicates that the network device runs normally; or if the first device does not receive an RM message corresponding to the address family information, it indicates that the network device is faulty. In this case, the first device may perform specific fault analysis with reference to the following health status information. When the BMP notification message received by the first device includes that a first indication corresponding to a piece of address family information is monitoring enabled, and a corresponding configuration state is the second configuration state, that is, the network device has configured the address family information and the peer of the network device has not configured the address family information, it indicates that the configuration of the network device is incorrect or that the configuration of the peer is incorrect. If the configuration of the network device is incorrect, the first device may send a deletion instruction to the network device, where the deletion instruction is used to delete the address family information configured by the network device, to resolve a problem that the configuration of the network device is incorrect; or if the configuration of the peer is incorrect, the first device may send a configuration instruction to the peer, where the configuration instruction is used to configure the address family information in the peer. When the BMP notification message received by the first device includes that a first indication corresponding to a piece of address family information is monitoring enabled, and a corresponding configuration state is the third configuration state, that is, the network device has not configured the address family information, it indicates that the configuration of the network device is incorrect, or that the configuration of the peer is incorrect, or that a monitoring configuration of the network device is incorrect. The first device may send a configuration instruction to the network device, where the configuration instruction is used to configure the address family information in the network device, to resolve a problem that the configuration of the network device is incorrect. If the peer has configured the address family information, the first device may further send a deletion instruction to the peer, where the deletion instruction is used to delete the address family information configured by the peer, to resolve a problem that the configuration of the peer is incorrect. The first device may further send a deletion instruction to the network device, where the deletion instruction is used to delete the first indication corresponding to the address family information, to resolve a problem that the monitoring configuration of the network device is incorrect. Alternatively, the first device may determine whether monitoring has been enabled for the address family information. If yes, it indicates that link congestion may occur between the network device and the first device, and an information loss may occur. In this case, a link bandwidth between the first device and the network device may be increased. By taking the foregoing measures, the first device can ensure that a BGP session between the network device and the peer runs normally.

In a second possible implementation, the BGP information of the network device includes resource usage information of the network device. When the resource usage information of the network device meets a preset condition, it indicates that the network device runs in overload. In this case, the first device may adjust a service flow corresponding to the resource usage information, or generate an alarm, to reduce load of the network device. For specific resource usage information, refer to the foregoing description. Details are not described herein again.

In a third possible implementation, the BGP information of the network device includes health status information of the network device. When the first device diagnoses, based on the health status information of the network device, that the network device may be faulty, the first device may take a corresponding measure to rectify the fault of the network device.

For example, the health status information of the network device may include message backlog information of a message queue of the network device. When the first device determines, based on the message backlog information, that a message backlog in the message queue of the network device is severe, the first device may adjust a service flow corresponding to the message queue or generate an alarm. For example, the message backlog information includes a quantity of messages in the message queue, and the first device adjusts the service flow corresponding to the message queue or generates an alarm, to rectify a message backlog problem.

For another example, the health status information of the network device includes information about a slow peer corresponding to address family information configured by the network device. When the first device determines, based on the information about the slow peer, that the peer may be faulty or that a link between the network device and the peer may be faulty, the first device may perform a further check to determine a cause of the problem and take a measure to rectify the problem.

In a fourth possible implementation, the BGP information of the network device includes security state information of the network device. When the first device determines, based on the security state information of the network device, that the network device has a potential security risk, the first device may take a related measure to reduce or even eliminate the potential security risk.

For example, when the security state information of the network device includes that a GTSM is enabled for a BGP session, the first device may determine whether a valid time to live TTL hop count is appropriate. If the valid time to live TTL hop count is inappropriate, the first device may perform a corresponding adjustment, to find a balance between ensuring security and ensuring normal running of the network device.

When the security state information of the network device includes that the GTSM is not enabled for the BGP session, a risk that the network device is attacked is high, and the first device may deliver an enable instruction to the network device, where the enable instruction is used to instruct the network device to enable the GTSM, to ensure security of the network device.

Optionally, the security state information of the network device includes whether security authentication is enabled for the BGP session of the network device. When the security state information of the network device includes that security authentication is enabled for the BGP session of the network device, the first device may determine, based on an authentication mode and/or an authentication algorithm of the security authentication, whether the security authentication meets a security requirement. If the security authentication does not meet the security requirement, the authentication algorithm and/or the authentication mode of the security authentication may be adjusted to ensure security of the network device.

Optionally, the security state information of the network device includes whether origin authentication is enabled for the BGP session of the network device. When the security state information of the network device includes that origin authentication is enabled for the BGP session of the network device, the first device may determine whether invalid routing prefix information of origin authentication is incorrectly determined. If yes, the first device may deliver an enable instruction to the network device, where the enable instruction is used to enable an incorrectly determined routing prefix, to reduce resource waste while ensuring security of the network device.

When the security state information of the network device includes that origin authentication is not enabled for the BGP session, a possibility that the network device is attacked is high, and the first device may send an enable instruction to the network device, where the enable instruction is used to instruct the network device to enable origin authentication, to ensure security of the network device.

When the security state information of the network device includes a quantity of received routing prefixes, the first device may determine whether the quantity of routing prefixes received by the network device is greater than or equal to a threshold. If yes, it indicates that the network device is in a heavy-load running state, some services may fail to run normally, and the first device may give an early warning or adjust a service flow of the network device, to reduce load of the network device while ensuring security of the network device.

When the security state information of the network device includes a quantity of received routing prefixes corresponding to the address family information, the first device may determine whether the quantity of received routing prefixes corresponding to the address family information is greater than or equal to a threshold. If yes, it indicates that the network device is in a heavy-load running state, and some services may fail to run normally. The first device may give an early warning, to reduce load of the network device while ensuring security of the network device. Alternatively, the first device may further determine whether a routing prefix corresponding to the address family information is valid, and if yes, increase a maximum quantity of routing prefixes allowed to be received, and send the adjusted value to the network device, to ensure normal running of the network device while ensuring security of the network device.

When the security state information of the network device includes address family information for which no routing prefix threshold is set, the network device may be subject to a risk of running in overload because a large quantity of routing prefixes are received. The first device may deliver a setting instruction, where the setting instruction is used by the network device to set a routing prefix threshold for the address family. In this way, the network device can give an early warning, to ensure security of the network device.

When the security state information of the network device includes that an error update message ignore function is enabled, there may be a risk that routing information of the network device is not synchronized with routing information of the peer. The first device may obtain an error update message and analyze the error update message, to ensure security of the network device.

When the security state information of the network device includes that the error update message ignore function is disabled, the network device terminates the BGP session with the peer, possibly causing a risk of network flapping. The first device may send an enable instruction to the network device, where the enable instruction is used to instruct the network device to enable the error update message ignore function, or the first device may perform a protection measure against network flapping, to ensure network security.

When the security state information of the network device includes whether an error update message ignore function corresponding to the address family information is enabled, an action performed by the first device is similar to an action performed when the security state information of the network device includes that the error update message ignore function is enabled. Details are not described herein again.

When the security state information of the network device includes that a function of checking a first autonomous system AS number of an autonomous system path AS_Path attribute in an update message sent by an EBGP peer to the network device is not enabled, the first device may determine whether all peers of the network device are route servers (Route Server), and if no, may send an enable instruction to the network device, where the enable instruction is used to enable the function of checking the first autonomous system AS number of the autonomous system path AS_Path attribute in the update message sent by the EBGP peer to the network device, to ensure security of the network device.

When the security state information of the network device includes that a function of checking a first AS number of an AS_Path list in an update message sent by a first EBGP peer is not enabled for the first EBGP peer, the first device may determine whether the EBGP peer is a route server, and if no, may send an enable instruction to the network device, where the enable instruction is used to enable the function of checking the first autonomous system AS number of the autonomous system path AS_Path attribute in the update message sent by the EBGP peer to the network device, to ensure security of the network device.

When the security state information of the network device includes that a local AS number is allowed to repeatedly appear for a plurality of times, the first device may determine whether the network device and the peer belong to a same network provider. If no, a risk that a routing loop occurs on the network device is high, and the first device may send a disable instruction to the network device, where the disable instruction is used to instruct the network device to disable the function of allowing the local AS number to repeatedly appear for a plurality of times, to ensure security of the network device.

When the security state information of the network device includes that no corresponding inbound policy is configured for an address family, the first device may determine whether the network device and the peer belong to the same network provider. If no, a possibility that the network device receives an invalid route is high, and the first device may send a configuration instruction to the network device, where the configuration instruction is used to instruct the network device to configure an inbound policy for the address family, to ensure security of the network device.

When the security state information of the network device includes that no corresponding outbound policy is configured for an address family, the first device may determine whether the network device and the peer belong to the same network provider. If no, a possibility that the network is affected is high, and the first device may send a configuration instruction to the network device, where the configuration instruction is used to instruct the network device to configure an outbound policy for the address family, to ensure security of the network device.

When the security state information of the network device includes that secure socket layer SSL authentication is enabled, it indicates that security of the BGP session of the network device is high. When the first device receives different BGP sessions that carry a same routing prefix, the first device preferentially uses a BGP session of a network device that enables SSL authentication, to ensure security of the network device.

According to a third aspect, an embodiment of this application provides a network device, including a processor and a memory, where the memory is configured to store a computer program or computer instructions, and the processor is configured to invoke the computer program or the computer instructions stored in the memory, so that the network management device performs the foregoing information reporting method.

According to a fourth aspect, an embodiment of this application provides a network management device, including a processor and a memory, where the memory is configured to store a computer program or computer instructions, and the processor is configured to invoke the computer program or the computer instructions stored in the memory, so that the network management device performs the foregoing information processing method.

According to a fifth aspect, an embodiment of this application provides a computer-readable storage medium, including instructions, where when the instructions are run on a computer, the computer is enabled to perform the foregoing information reporting method or information processing method.

DETAILED DESCRIPTION OF ILLUSTRATIVE EMBODIMENTS

Embodiments of this application provide a method, to automatically obtain BGP information, improve efficiency of obtaining information, and reduce costs.

For ease of understanding, an application scenario of embodiments of this application is described first.

Figure 1:
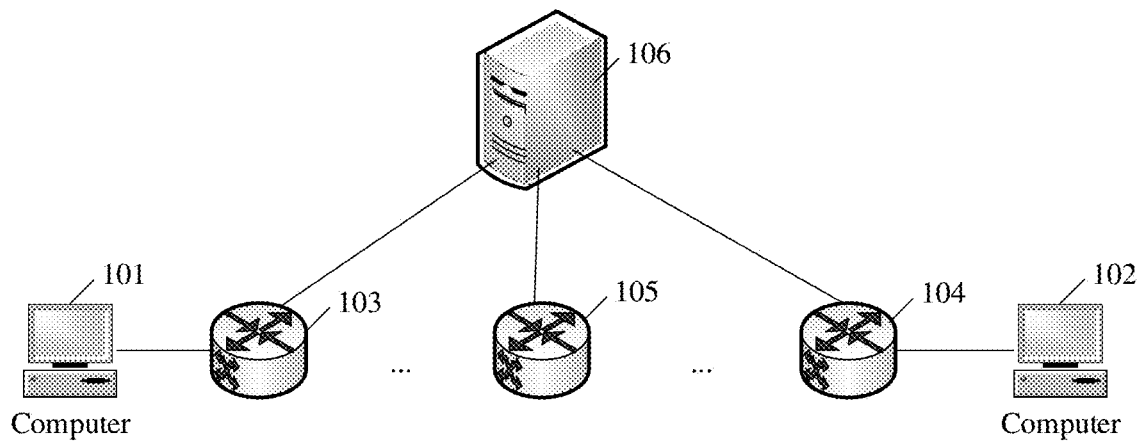
FIG. 1 is a schematic diagram of an architecture of a system 100 according to an embodiment of this application.

FIG. 1 is a schematic diagram of an architecture of a system 100 according to an embodiment of this application.

The system 100 includes a customer edge (CE) device 101, a customer edge device 102, a provider edge (PE) device 103, and a provider edge device 104. The customer edge device 101 is connected to the provider edge device 103. The customer edge device 102 is connected to the provider edge device 104. The provider edge device 103 and the provider edge device 104 are connected by using one or more provider (P) devices 105.

The customer edge device 101 and the customer edge device 102 may be terminal devices. The terminal device may also be referred to as user equipment (UE), a mobile station (MS), a mobile terminal (MT), a terminal, or the like, and is a device that provides voice and/or data connectivity for a user, or a chip disposed in the device, for example, a handheld device or a vehicle-mounted device having a wireless connection function. Currently, some examples of the terminal device are a mobile phone, a desktop computer, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in smart home, a 5G-residential gateway (5G-RG), and the like.

The provider edge device 103, the provider edge device 104, and the provider device 105 may be routers, switches, or the like, and are configured to transmit messages between the customer edge device 101 and the customer edge device 102. Any two devices that transmit routing messages to each other between the provider edge device 103, the provider edge device 104, and one or more provider devices 105 are mutually referred to as peers.

In this embodiment of this application, the system 100 further includes a BGP Monitoring Protocol (BMP) server 106. The BMP server 106 may be connected to one or more of the provider edge device 103, the provider edge device 104, and the provider device 105, and configured to obtain BGP information of a corresponding device.

Figure 2:
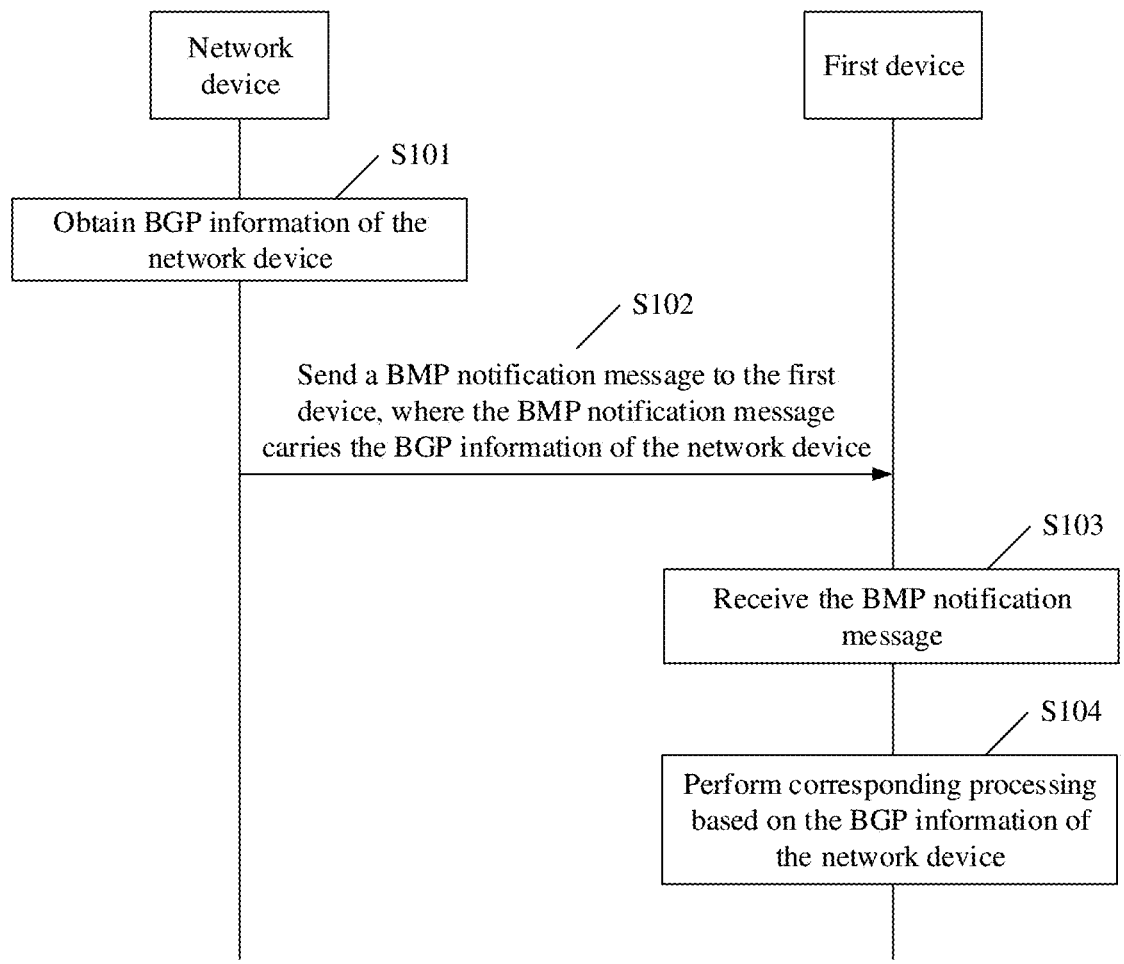
FIG. 2 is a signaling interaction diagram of a monitoring method according to an embodiment of this application.

FIG. 2 is a signaling interaction diagram of a monitoring method according to an embodiment of this application.

The monitoring method provided in this embodiment of this application includes the following steps.

S101. A network device obtains BGP information of the network device.

S102. The network device sends a BMP notification message to a first device, where the BMP notification message carries the BGP information of the network device.

In this embodiment of this application, the network device may be the provider edge device 103, the provider edge device 104, or the provider device 105 in FIG. 1. The first device may be the BMP server 106 in FIG. 1. The first device may be a terminal device such as a notebook computer or a desktop computer, in addition to the server. This is not specifically limited in this application.

In this embodiment of this application, the BGP information may include one or more of address family monitoring information of the network device, resource information of the network device, health status information of the network device, security state information of the network device, and the like. Details are described subsequently.

After obtaining the BGP information of the network device, the network device may add the BGP information of the network device to the BMP notification message (notification message) to be sent by the network device to the first device, and send the BMP notification message. Before sending the BMP notification message to the first device, the network device may first establish a BMP session with the first device.

Figure 3:
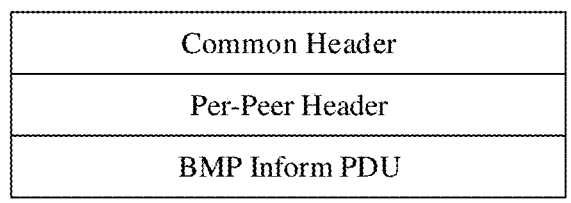
FIG. 3 is a schematic diagram of a format of a BMP notification message according to an embodiment of this application.

FIG. 3 is a schematic diagram of a format of the BMP notification message. In FIG. 3, the BMP notification message includes a common header, a per-peer header, and a BMP inform protocol data unit (BMP inform PDU).

Figure 4:
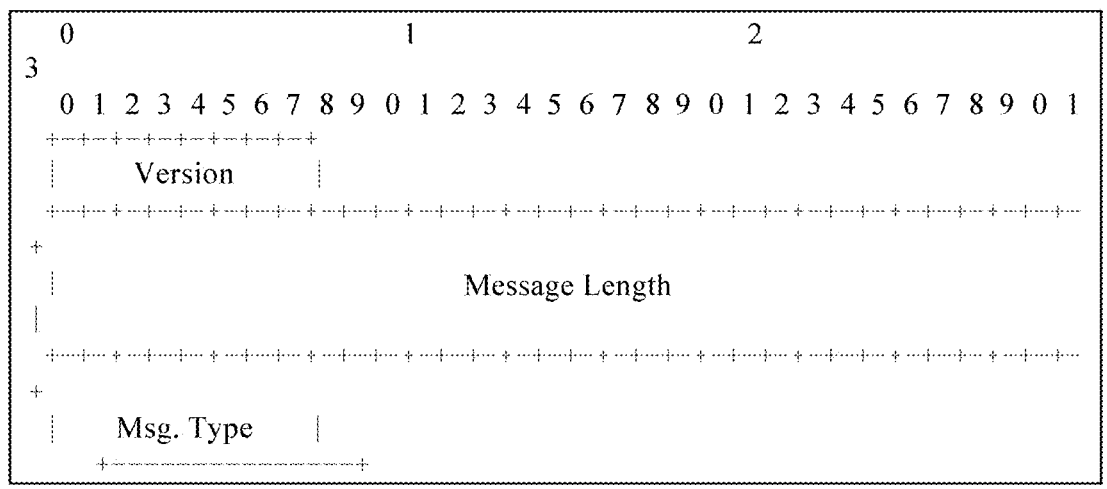
FIG. 4 is a schematic diagram of a format of a common header according to an embodiment of this application.

FIG. 4 is a schematic diagram of a format of the common header. It can be learned from the figure that the common header includes a version field, a message length field, and a message type (Msg. Type) field. The version field carries a version number of the BMP notification message. The message length field carries a length value of the BMP notification message. The Msg. Type field carries a type value corresponding to the BMP notification message.

Figure 5:
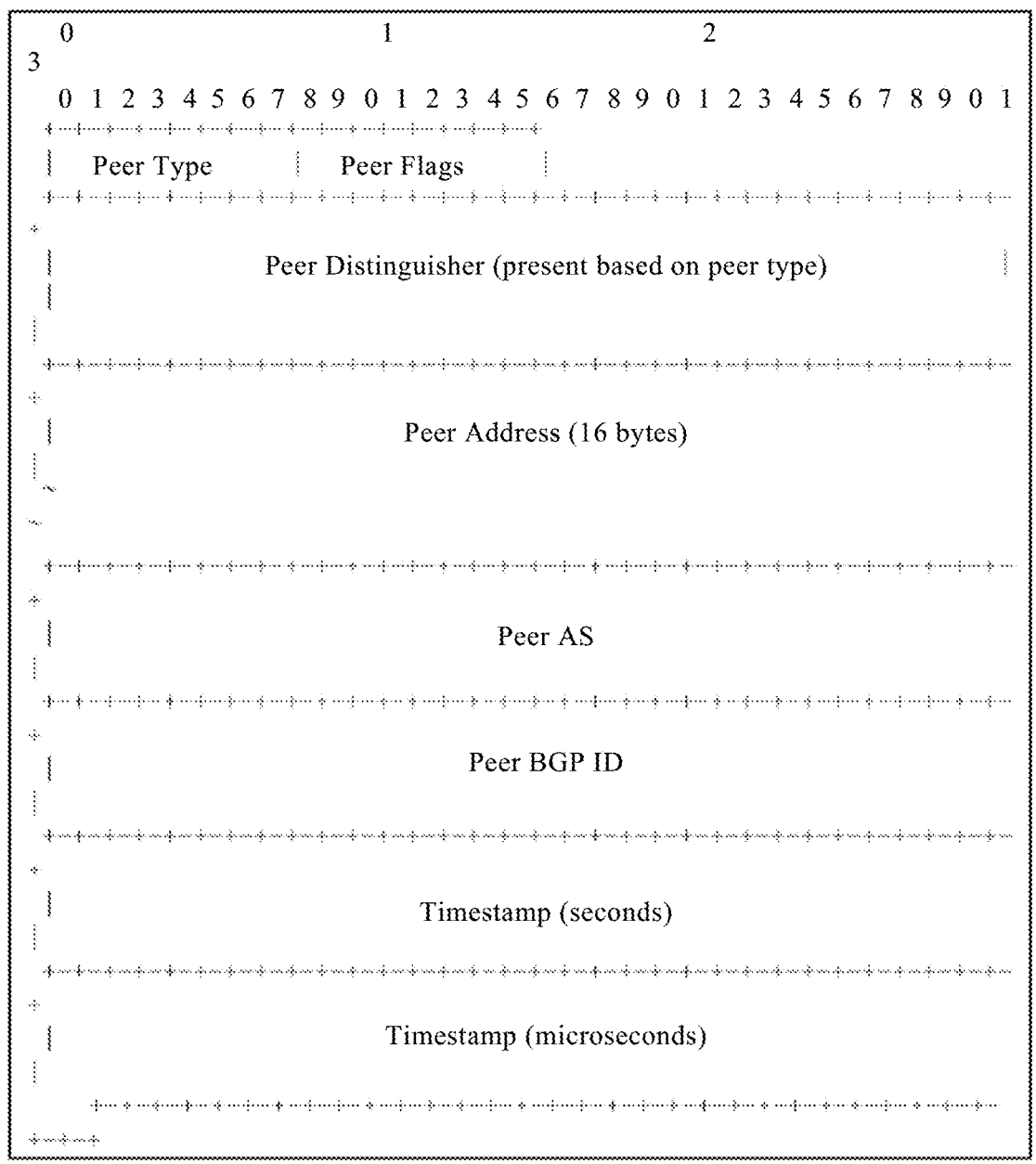
FIG. 5 is a schematic diagram of a format of a per-peer header according to an embodiment of this application.

FIG. 5 is a schematic diagram of a format of the per-peer header. It can be learned from the figure that the per-peer header includes a peer type field, a peer flags field, a peer distinguisher field (currently determined based on a peer type), a peer address field, a peer autonomous system (peer AS) field, a peer BGP identifier (peer BGP ID) field, a timestamp (second level) field, and a timestamp (millisecond level) field.

The peer type field carries a value indicating the peer type. The peer flags field carries peer information. The peer distinguisher field carries an identifier of a peer. The peer address field carries a peer address. The peer AS field carries an identifier of a peer autonomous system. The peer BGP ID field carries a BGP identifier of the peer. The timestamp field carries a time (including the second level and the millisecond level) for sending the BMP notification message.

In this embodiment of this application, the BGP information of the network device may be carried in a type-length-value (TLV) field of the BMP inform PDU. Different BGP information may be carried in different TLV fields.

The following describes specific BGP information and the format of the corresponding TLV field.

In a first possible implementation, the BGP information of the network device may include the address family monitoring information of the network device. Specifically, the address family monitoring information may include address family information and a first indication, and the first indication is used t0 indicate whether monitoring is enabled for an address family corresponding to the address family information.

In this embodiment of this application, the address family information may include an address family identifier (AFI), or may include an address family identifier and a subsequent address family identifier (SAFI). The address family identifier is used to identify the address family; and the subsequent address family identifier is used to identify a subsequent address family of the address family.

In an actual application, the network device may obtain a BMP configuration table. The BMP configuration table may store a correspondence between address family information and whether monitoring is enabled for an address family corresponding to the address family information, where the correspondence indicates address family information for which corresponding BGP sessions need to be monitored and address family information for which monitoring is not required. The BMP configuration table may be preconfigured in the network device, or may be delivered by a controller to the network device. After the BMP configuration table is generated or a change occurs (for example, monitoring is enabled for new address family information or monitoring of address family information is changed from "enabled" to "not enabled"), the network device may send, to the first device, the BMP notification message carrying the correspondence.

For example, Table 1 is an example of the BMP configuration table in the network device.

TABLE 1

| Address family information | Whether monitoring is enabled |
|---|---|
| AFI = 1 and SAFI = 1 | Monitoring is enabled |
| AFI = 1 and SAFI = 2 | Monitoring is not enabled |
| AFI = 1 and SAFI = 128 | Monitoring is enabled |
| AFI = 2 and SAFI = 1 | Monitoring is enabled |

AFI=1 and SAFI=1 indicate an Internet Protocol version 4 (Internet Protocol version 4, IPv4) unicast address family; AFI=1 and SAFI=2 indicate an IPv4 multicast address family; AFI=1 and SAFI=128 indicate a virtual private network version 4 (virtual private network version 4, VPNv4) address family; AFI=2 and SAFI=1 indicate an Internet Protocol version 6 (Internet Protocol version 6, IPv6) unicast address family. Table 1 indicates that BGP sessions corresponding to the IPv4 unicast address family, the VPNv4 address family, and the IPv6 unicast address family need to be monitored, and that a BGP session corresponding to the IPv4 multicast address family does not need to be monitored.

In this embodiment of this application, the address family information and the first indication may be carried in a BGP Monitoring Update TLV field. The AFI may occupy two bytes in the BGP Monitoring Update TLV field, and the SAFI may occupy one byte in the BGP Monitoring Update TLV field.

Figure 6:
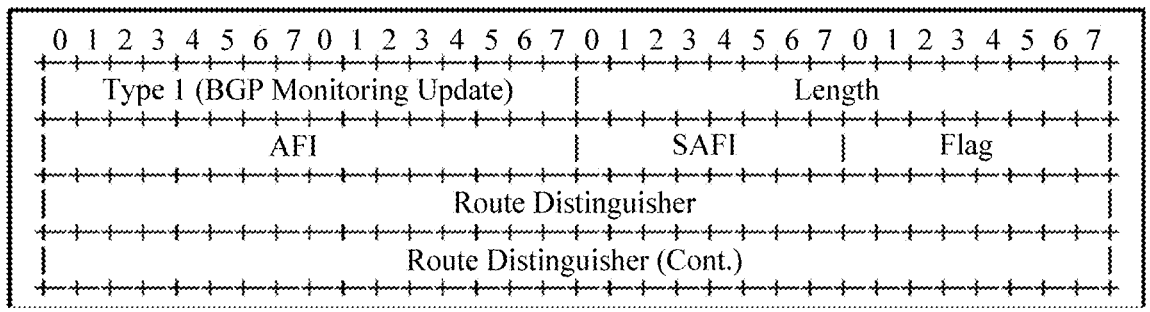
FIG. 6 is a schematic diagram of a format of a BGP Monitoring Update TLV field according to an embodiment of this application.

FIG. 6 is a schematic diagram of a format of the BGP Monitoring Update TLV field. In FIG. 6, a type field in the BGP Monitoring Update TLV field carries a value of a type of the BGP Monitoring Update TLV. For example, the value is 1. A specific value may be allocated by the International Internet Engineering Task Force (IETF). A length field in the BGP Monitoring Update TLV field carries a length value of the BGP Monitoring Update TLV. A value field in the BGP Monitoring Update TLV field includes an AFI field, a SAFI field, a flag field, and a route distinguisher field.

The AFI field carries the AFI. The SAFI field carries the SAFI. The Flag field carries a value of the first indication. For example, when the value of the Flag field is 0, it indicates that monitoring is enabled for the address family corresponding to the address family information. If the value of the Flag field is 1, it indicates that monitoring is disabled for the address family corresponding to the address family information. The Route Distinguisher field may occupy eight bytes. When a value of the Route Distinguisher field is not 0, it identifies that the peer belongs to a VPN instance of the route identifier.

In this embodiment of this application, the BGP Monitoring Update TLV field may be not only in the BMP inform PDU, but also in the per-peer header. If the BGP Monitoring Update TLV field is in the per-peer header, the value of the Route Distinguisher field in the BMP inform PDU may be 0.

In addition to the address family information and the first indication, the address family monitoring information of the network device may further include a configuration state corresponding to the address family information, and the configuration state is a state about whether the network device and/or the peer of the network device have/has configured the address family information. It should be noted that the "configuration" of the address family information herein is to establish a BGP session. The meaning is different from a meaning of the "configuration" of the BMP configuration table mentioned above.

In this embodiment of this application, the configuration state may be a first configuration state, a second configuration state, or a third configuration state.

The first configuration state indicates that both the network device and the peer of the network device have configured the address family information. If both the network device and the peer of the network device have configured the address family information, a BGP session corresponding to the address family information may be established between the network device and the peer of the network device.

When the configuration state is the first configuration state, the network device may send a route monitoring (RM) message to the first device, where the RM message may carry routing information corresponding to the address family information. After receiving the RM message, the first device may store the routing information corresponding to the address family information.

The second configuration state indicates that the network device has configured the address family information, and that the peer of the network device has not configured the address family information. The third configuration state indicates that the network device has not configured the address family information. The foregoing two configuration states indicate that the network device and the peer of the network device cannot establish the BGP session corresponding to the address family information. In this case, if the first indication indicates that monitoring is to be enabled for the address family corresponding to the address family information, it indicates that a problem may exist in the configuration of the network device and/or the peer of the network device, and the first device needs to perform further processing. For a specific processing method, refer to the following description. Details are not described herein.

In this embodiment of this application, the configuration state may be carried in the BGP Monitoring Update TLV field, and specifically carried in the Flag field. When the value of the Flag field is 0, it indicates the first configuration state; when the value of the Flag field is 1, it indicates the second configuration state; or when the value of the Flag field is 2, it indicates the third configuration state.

Optionally, the address family monitoring information of the network device may further include a routing information type. In this embodiment of this application, the routing information type refers to a type of the routing information corresponding to the address family information. For example, the routing information type may include pre-policy routing information and/or post-policy routing information. The routing information type may also be carried in the BGP Monitoring Update TLV field, and specifically carried in the Flag field. When the value of the Flag field is 0, it indicates that the routing information type is pre-policy routing information. When the value of the Flag field is 1, it indicates that the routing information type is post-policy routing information. When the value of the Flag field is 2, it indicates that the routing information type is pre-policy routing information or post-policy routing information.

The routing information type may also be stored in the foregoing BMP configuration table. Table 2 is another example of the BMP configuration table.

TABLE 2

| Address family information | Whether monitoring is enabled | Routing type information |
|---|---|---|
| AFI = 1 and SAFI = 1 | Monitoring is enabled | pre-policy & post-policy |
| AFI = 1 and SAFI = 2 | Monitoring is not enabled | |
| AFI = 1 and SAFI = 128 | Monitoring is enabled | post-policy |

Table 2 shows that the BGP session corresponding to the IPv4 unicast address family needs to be monitored, and the routing information type of the BGP session is pre-policy and post-policy; the BGP session corresponding to the VPNv4 address family needs to be monitored, and the routing information type of the BGP session is post-policy; and the BGP session corresponding to the IPv4 multicast address family does not need to be monitored.

Figure 7:
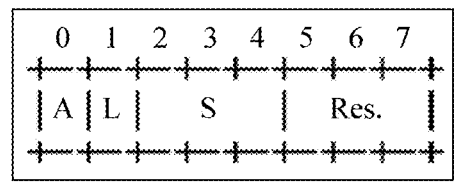
FIG. 7 is a schematic diagram of bits of a Flag field according to an embodiment of this application.

FIG. 7 is a schematic diagram of bits in the Flag field. In this figure, the Flag field includes four bits, represented by A, L, S, and Reserved (Res.) respectively. A is used to carry the first indication, L is used to carry the configuration state, and S is used to carry the routing information type.

Table 3 shows meanings expressed when A, L, and S are different values.

TABLE 3

| Bit | Value | Meaning |
|---|---|---|
| A | 0 | Monitoring is enabled for the address family corresponding to the address family information |
| | 1 | Monitoring is disabled for the address family corresponding to the address family information |
| L | 0 | First configuration state |
| | 1 | Second configuration state |
| | 2 | Third configuration state |
| S | 0 | Pre-policy |
| | 1 | Post-policy |
| | 2 | Pre-policy and post-policy |

It may be understood that the address family monitoring information does not constitute a limitation on the technical solution of this application. Persons skilled in the art may design the address family monitoring information at discretion based on an actual situation.

In a second possible implementation, the BGP information of the network device includes the resource information of the network device. The resource information of the network device includes resource usage information and/or resource quota information of the network device. The resource usage information indicates resource usage of the network device. The resource quota information indicates a maximum resource allowed to be used by the network device.

Figure 8:
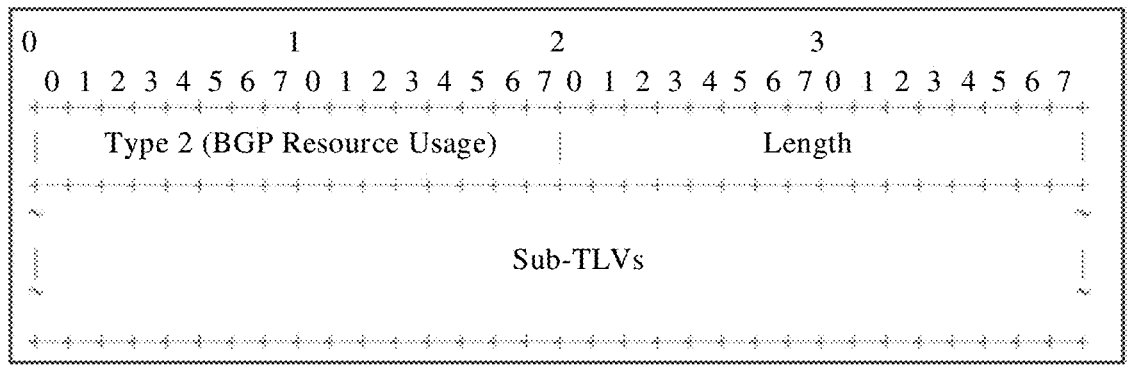
FIG. 8 is a schematic diagram of a format of a BGP Resource Usage TLV field according to an embodiment of this application.

In this embodiment of this application, the resource information of the network device may be carried in a BGP resource usage TLV field in the BMP notification message. FIG. 8 is a schematic diagram of a format of the BGP Resource Usage TLV field. In FIG. 8, the BGP Resource Usage TLV field includes a type field, a length field, and a sub-TLV field. A value of the type field may be, for example, 2, indicating that the TLV is a BGP Resource Usage TLV. The length field may occupy two bytes, indicating a total length of one or more subsequent Sub-TLVs. The Sub-TLV field may include one or more sub-TLVs indicating specific resource usage information and/or resource quota information.

Table 4 is an example of resource usage information, resource quota information, and sub-TLV names.

TABLE 4

| Sub-TLV name | Resource usage information | Resource quota information |
|---|---|---|
| Quantity of BGP sessions (BGP Session Number) | Quantity of used BGP sessions | Total quantity of supported BGP sessions |
| Quantity of BGP instances (BGP Instance Number) | Quantity of used BGP instances | Total quantity of supported BGP instances |
| Quantity of BGP routing entries (BGP Routes Number) | Quantity of used BGP routing entries | Total quantity of supported BGP routing entries |
| Quantity of BGP routing entries corresponding to address family information (BGP Routes Number Per AFI/SAFI) | Quantity of BGP routing entries corresponding to the address family information | |
| Quantity of BGP forwarding entries (BGP FIB Number) | Quantity of BGP routing entries delivered to forwarding entries | Total quantity of supported forwarding entries |

TABLE 4-continued

| Sub-TLV name | Resource usage information | Resource quota information |
| --- | --- | --- |
| Quantity of BGP forwarding entries corresponding to address family information (BGP FIB Number Per AFI/SAFI) | Quantity of BGP forwarding entries corresponding to the address family information | |
| BGP memory size (BGP Memory Size) | Used memory size | Total memory size |
| BGP memory size corresponding to address family information (BGP Memory Size Per AFI/SAFI) | Used memory size corresponding to the address family information | |

The BGP Session Number TLV field may further include a quantity of used Internal Border Gateway Protocol (IBGP) peer sessions and/or a quantity of used External Border Gateway Protocol (EBGP) peer sessions.

Figure 9:
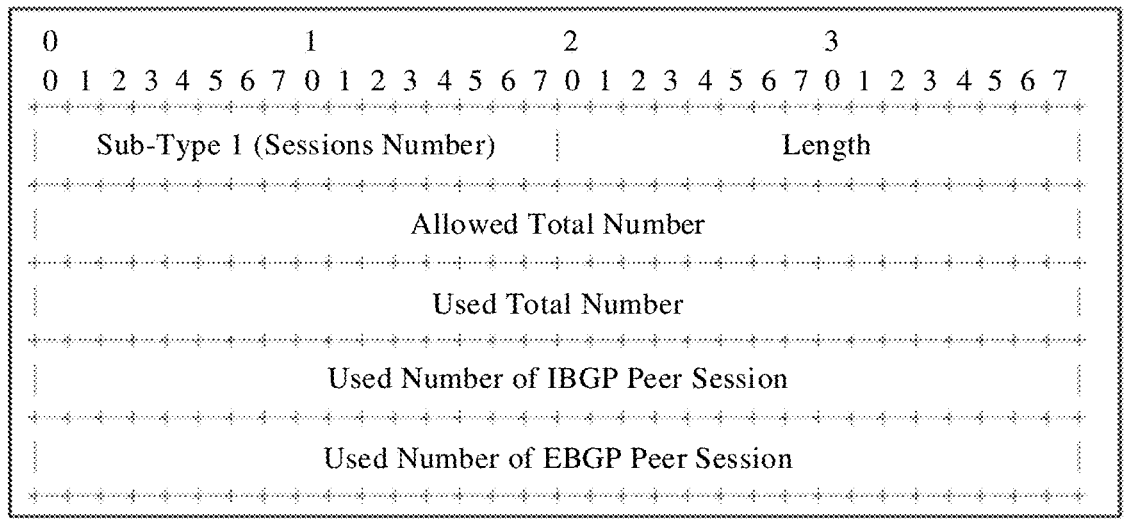
FIG. 9 is a schematic diagram of a format of a BGP Session Number Sub-TLV field according to an embodiment of this application.

FIG. 9 is a schematic diagram of a format of the BGP Session Number Sub-TLV field according to an embodiment of this application. In FIG. 9, the BGP Session Number Sub-TLV field includes a Sub-Type field, a Length field, an Allowed Total Number field, a Used Total Number field, a Used Number of IBGP Peer Session field, and a Used Number of EBGP Peer Session field. The Sub-Type field carries a value indicating a type of the BGP Session Number TLV field, for example, 1. The Length field carries a total length of the value of the Sub-TLV. The Allowed Total Number field carries a total quantity of BGP sessions supported by the network device. The Used Total Number field carries a quantity of BGP sessions used by the network device. The Used Number of IBGP Peer Session field carries a quantity of IBGP peer sessions used by the network device. The Used Number of EBGP Peer Session field carries a quantity of EBGP peer sessions used by the network device.

Figure 10:
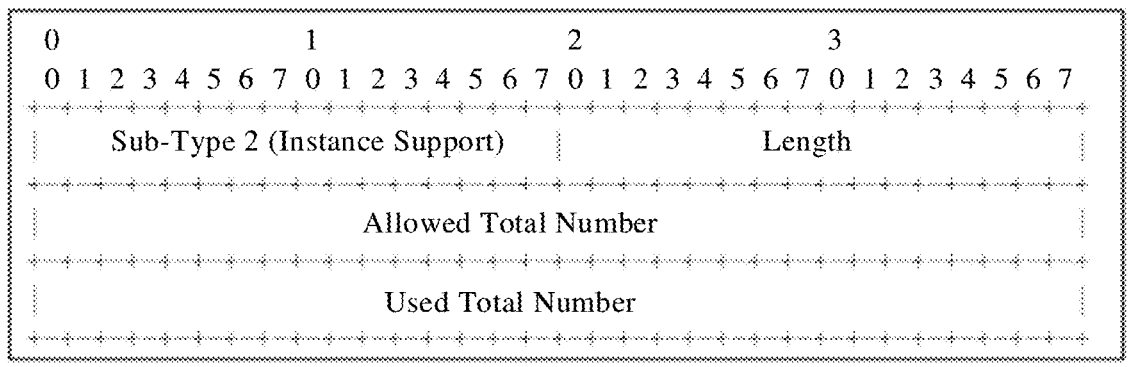
FIG. 10 is a schematic diagram of a format of a BGP Instance Number Sub-TLV field according to an embodiment of this application.

FIG. 10 is a schematic diagram of a format of the BGP Instance Number Sub-TLV field according to an embodiment of this application. In FIG. 10, the BGP Instance Number Sub-TLV field includes a Sub-Type field, a Length field, an Allowed Total Number field, and a Used Total Number field. The Sub-Type field carries a value indicating a type of the BGP Instance Number Sub-TLV field, for example, 2. The Length field carries a total length of the value of the Sub-TLV. The Allowed Total Number field carries a total quantity of BGP instances supported by the network device, and the Used Total Number field carries a quantity of BGP instances used by the network device. In this embodiment of this application, the BGP instances may include public network instances and/or private network instances.

Figure 11:
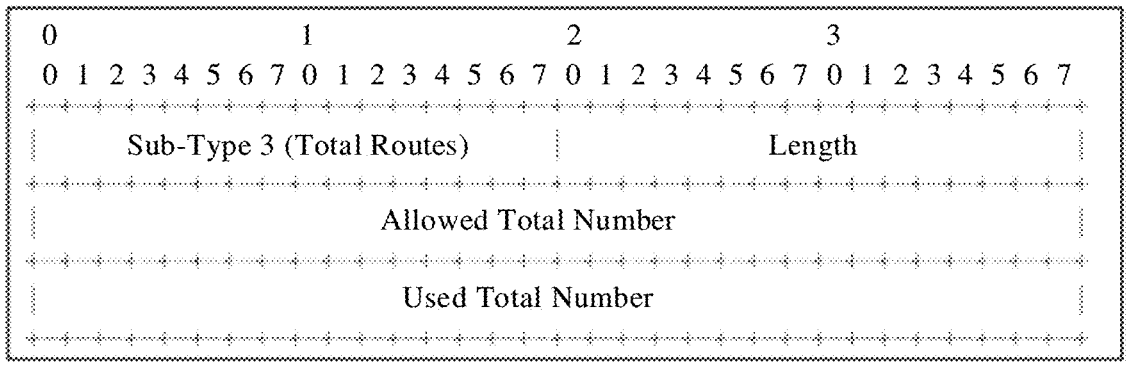
FIG. 11 is a schematic diagram of a format of a BGP Routes Number Sub-TLV field according to an embodiment of this application.

FIG. 11 is a schematic diagram of a format of the BGP Routes Number Sub-TLV field according to an embodiment of this application. In FIG. 11, the BGP Routes Number Sub-TLV field includes a Sub-Type field, a Length field, an Allowed Total Number field, and a Used Total Number field. The Sub-Type field carries a value indicating a type of the BGP Routes Number Sub-TLV field, for example, 3. The Length field carries a total length of the value of the Sub-TLV. The Allowed Total Number field carries a total quantity of BGP routing entries supported by the network device, and the Used Total Number field carries a quantity of BGP routing entries used by the network device. In this embodiment of this application, the BGP routing entries may include public network routing entries and/or private network routing entries.

Figure 12:
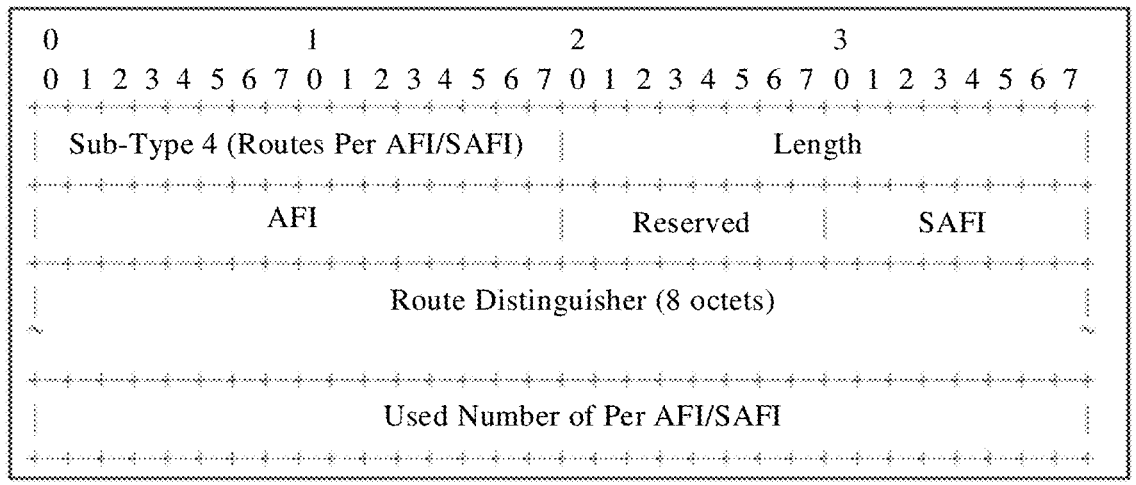
FIG. 12 is a schematic diagram of a format of a BGP Routes Number Per AFI/SAFI Sub-TLV field according to an embodiment of this application.

FIG. 12 is a schematic diagram of a format of the BGP Routes Number Per AFI/SAFI Sub-TLV field according to an embodiment of this application. In FIG. 12, the BGP Routes Number Per AFI/SAFI Sub-TLV field includes a Sub-Type field, a Length field, an AFI field, a SAFI field, a Reserved field, a Route Distinguisher field, and a Used Number of Per AFI/SAFI field. The Sub-Type field carries a value indicating a type of the BGP Routes Number Per AFI/SAFI Sub-TLV field, for example, 4. The Length field carries a total length of the value of the Sub-TLV. The AFI field carries the AFI. The SAFI field carries the SAFI. The Route Distinguisher field may occupy eight bytes. When a value of the Route Distinguisher field is not 0, it identifies that the peer belongs to a VPN instance of the route identifier. The Used Number of Per AFI/SAFI field carries the quantity of BGP routing entries corresponding to the address family information.

Figure 13:
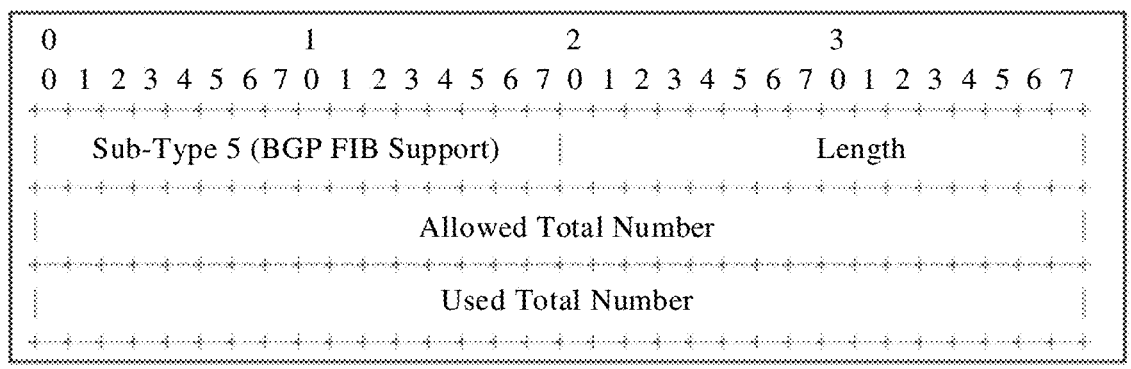
FIG. 13 is a schematic diagram of a format of a BGP FIB Number Sub-TLV field according to an embodiment of this application.

FIG. 13 is a schematic diagram of a format of the BGP FIB Number Sub-TLV field according to an embodiment of this application. In FIG. 13, the BGP FIB Number Sub-TLV field includes a Sub-Type field, a Length field, an Allowed Total Number field, and a Used Total Number field. The Sub-Type field carries a value indicating a type of the BGP FIB Number Sub-TLV field, for example, 5. The Length field carries a total length of the value of the Sub-TLV. The Allowed Total Number field carries a total quantity of forwarding entries (forward information base, FIB) supported by the network device, and the Used Total Number field carries a quantity of BGP routing entries delivered by the network device to the forwarding entries. In this embodiment of this application, the forwarding entries formed from the BGP routing entries may include public network forwarding entries and/or private network forwarding entries.

Figure 14:
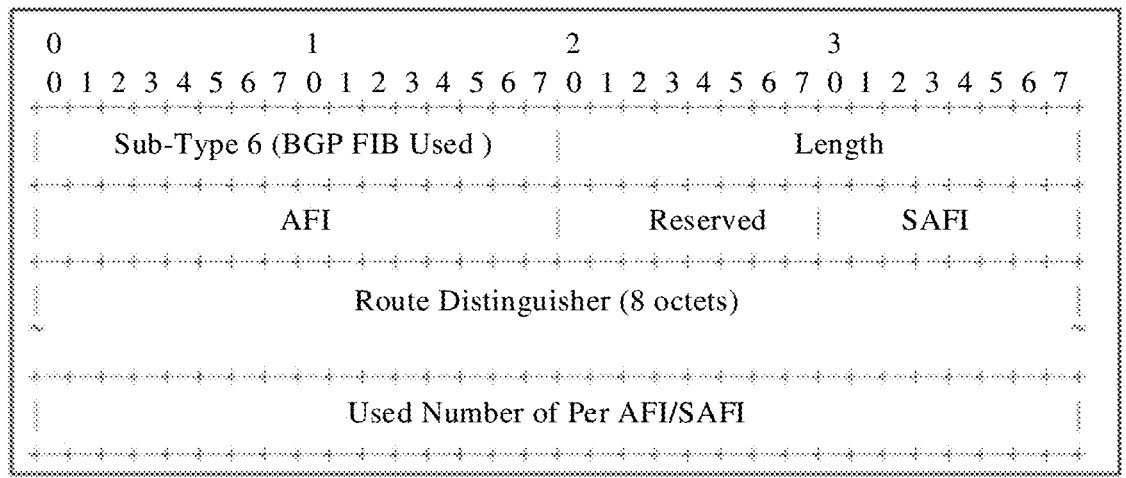
FIG. 14 is a schematic diagram of a format of a BGP FIB Number Per AFI/SAFI Sub-TLV field according to an embodiment of this application.

FIG. 14 is a schematic diagram of a format of the BGP FIB Number Per AFI/SAFI Sub-TLV field according to an embodiment of this application. In FIG. 14, the BGP FIB Number Per AFI/SAFI Sub-TLV field includes a Sub-Type field, a Length field, an AFI field, a SAFI field, a Reserved field, a Route Distinguisher field, and a Used Number of Per AFI/SAFI field. The Sub-Type field carries a value indicating a type of the BGP FIB Number Per AFI/SAFI Sub-TLV field, for example, 6. The Length field carries a total length of the value of the Sub-TLV. The AFI field carries the AFI. The SAFI field carries the SAFI. The Route Distinguisher field may occupy eight bytes. When a value of the Route Distinguisher field is not 0, it identifies that the peer belongs to a VPN instance of the route identifier. The Used Number of Per AFI/SAFI field carries the quantity of BGP forwarding entries corresponding to the address family information.

Figure 15:
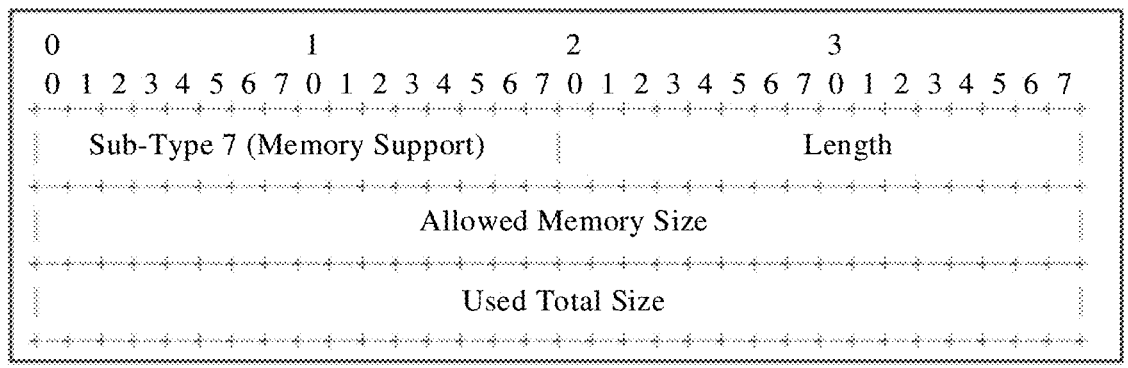
FIG. 15 is a schematic diagram of a format of a BGP Memory Size Sub-TLV field according to an embodiment of this application.

FIG. 15 is a schematic diagram of a format of the BGP Memory Size Sub-TLV field according to an embodiment of this application. In FIG. 15, the BGP Memory Size Sub-TLV field includes a Sub-Type field, a Length field, an Allowed Total Number field, and a Used Total Number field. The Sub-Type field carries a value indicating a type of the BGP Memory Size Sub-TLV field, for example, 7. The Length field carries a total length of the value of the Sub-TLV. The Allowed Total Number field carries a total memory size of the network device, and the Used Total Number field carries a used memory size of the network device. In this embodiment of this application, the memory size may be a memory size allocated to BGP for use.

Figure 16:
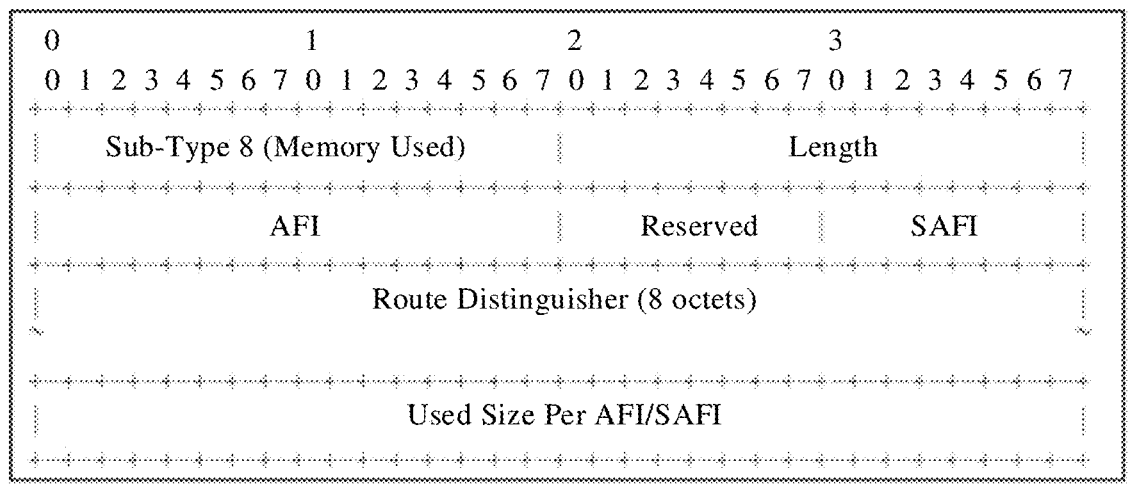
FIG. 16 is a schematic diagram of a format of a BGP Memory Size Per AFI/SAFI Sub-TLV field according to an embodiment of this application.

FIG. 16 is a schematic diagram of a format of the BGP Memory Size Per AFI/SAFI Sub-TLV field according to an embodiment of this application. In FIG. 16, the BGP Memory Size Per AFI/SAFI Sub-TLV field includes a Sub-Type field, a Length field, an AFI field, a SAFI field, a Reserved field, a Route Distinguisher field, and a Used Size Per AFI/SAFI field. The Sub-Type field carries a value indicating a type of the BGP Memory Size Per AFI/SAFI Sub-TLV field, for example, 8. The Length field carries a total length of the value of the Sub-TLV. The AFI field carries the AFI. The SAFI field carries the SAFI. The Route Distinguisher field may occupy eight bytes. When a value of the Route Distinguisher field is not 0, it identifies that the peer belongs to a VPN instance of the route identifier. The Used Size Per AFI/SAFI field carries the used memory size corresponding to the address family information.

It should be noted that the Sub-TLV fields shown in FIG. 9 to FIG. 16 do not constitute a limitation on the BGP resource information in this application. Persons skilled in the art may design the Sub-TLV fields at discretion.

Figure 17:
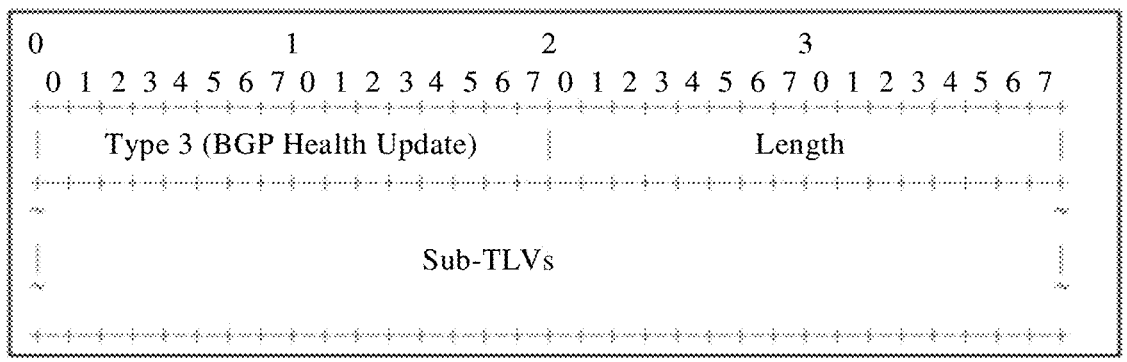
FIG. 17 is a schematic diagram of a format of a BGP Health Update TLV field according to an embodiment of this application.

In a third possible implementation, the BGP information of the network device includes the health status information of the network device. The health status information of the network device may be carried in a BGP health update TLV field. FIG. 17 is a schematic diagram of a format of the BGP Health Update TLV field. In FIG. 17, the BGP Health Update TLV field includes a type field, a length field, and a Sub-TLV field. A value of the type field may be, for example, 3, indicating that the TLV is a BGP Health Update TLV. The length field may occupy two bytes, indicating a total length of one or more subsequent Sub-TLVs. The Sub-TLV field may include one or more sub-TLVs indicating the health status information of the network device.

Table 5 is an example of Sub-TLV names and specific health status information.

TABLE 5

| Sub-TLV name | Health status information |
| --- | --- |
| BGP message input queue and message output queue (BGP InQ & OutQ) | Message backlog information of the message queue |
| BGP slow peer (BGP Slow Peer) | Information about a slow peer corresponding to the address family information |

It should be noted that, in this embodiment of this application, the message queue includes a message input queue and/or a message output queue. Sub-TLVs whose Sub-TLV names are the BGP message input queue and message output queue shown in Table 5 do not constitute a limitation on this application.

In this embodiment of this application, the message backlog information indicates a message backlog in the message queue, and is used to determine whether a speed of inputting and/or outputting a BGP packet on the network device is normal. The message backlog information includes a quantity of messages in the message queue, a maximum quantity of messages allowed by the message queue, and/or an alarm threshold for the message backlog in the message queue. The alarm threshold for the message backlog in the message queue may be a percentage. For example, if the alarm threshold for the message backlog in the message queue is 80%, it indicates that alarm processing needs to be performed when the messages in the message queue exceed 80% of the maximum quantity of allowed messages. Alternatively, the alarm threshold for the message backlog in the message queue may be a specific quantity, indicating that alarm processing needs to be performed when the messages in the message queue exceed the alarm threshold.

In this embodiment of this application, a slow peer, also referred to as a slow neighbor, means that when a BGP packet group includes a plurality of peers, if the network device sends routing information to one of the peers at a low speed due to network congestion or the like, a speed at which the network device sends routing information to another peer in the packet group is further affected, and in this case, the peer is referred to as a slow peer. In this embodiment of this application, a slow peer detection function may be configured on the network device, and used to detect the slow peer. A BGP packet group is a packet group formed by BGP peers having a same configuration. In this way, when sending routing information, the network device needs to perform packetization only once, and then can send the routing information to all peers in the group, thereby improving packetization efficiency.

In this embodiment of this application, because the peer corresponds to the address family information, the information about the slow peer corresponding to the address family information may include at least one or more of an address of the slow peer, the number of times that the peer corresponding to the address family information is recognized as the slow peer, a start time at which the peer corresponding to the address family information is recognized as the slow peer, an end time at which the peer corresponding to the address family information is recognized as the slow peer, and the like.

The following describes a format of the Sub-TLV field in the BGP Health Update TLV field with reference to the specific health status information shown in Table 5.

Figure 18:
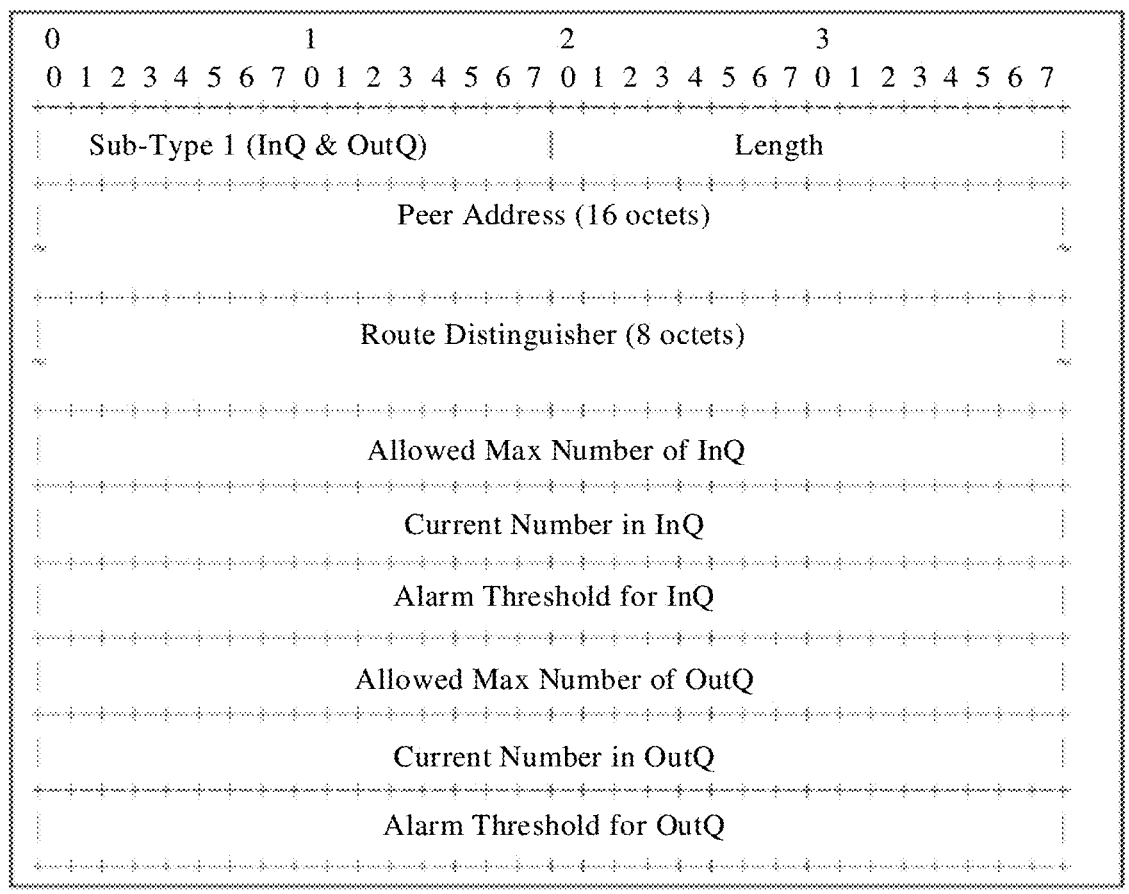
FIG. 18 is a schematic diagram of a format of a BGP InQ & OutQ Sub-TLV field according to an embodiment of this application.

FIG. 18 is a schematic diagram of a format of the BGP InQ & OutQ Sub-TLV field according to an embodiment of this application. In FIG. 18, the BGP InQ & OutQ Sub-TLV field includes a Sub-Type field, a Length field, a Peer Address field, a Route Distinguisher field, an Allowed Max Number of InQ field, a Current Number in InQ field, an Alarm Threshold for InQ field, an Allowed Max Number of OutQ field, a Current Number in OutQ field, and an Alarm Threshold for OutQ field. The Sub-Type field carries a value indicating a type of the BGP InQ & OutQ Sub-TLV field, for example, 1. The Length field carries a total length of the value of the Sub-TLV. The Peer Address field may occupy 16 bytes and is used to carry the address of the peer. The Route Distinguisher field may occupy eight bytes. When a value of the Route Distinguisher field is not 0, it indicates that the peer belongs to a VPN instance of the route identifier. The Allowed Max Number of InQ field is used to carry a maximum quantity of messages allowed by the message input queue. The Current Number in InQ field is used to carry a current quantity of messages in the message input queue. The Alarm Threshold for InQ field is used to carry an alarm threshold (for example, the threshold may be a percentage) for a backlog in the message input queue. The Allowed Max Number of OutQ field is used to carry a maximum quantity of messages allowed by the message output queue. The Current Number in OutQ field is used to carry a current quantity of messages in the message output queue. The Alarm Threshold for OutQ field is used to carry an alarm threshold (for example, the threshold may be a percentage) for a backlog in the message output queue.

Figure 19:
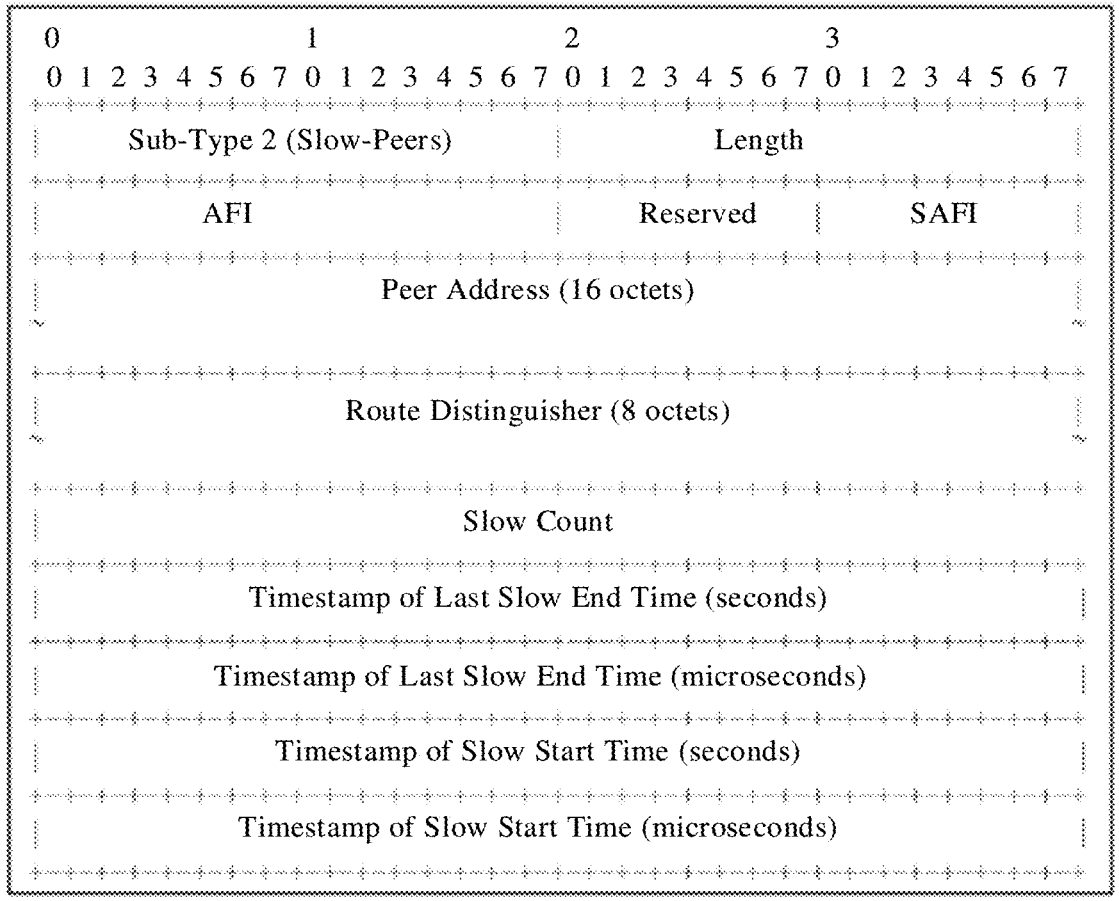
FIG. 19 is a schematic diagram of a format of a BGP Slow Peer Sub-TLV field according to an embodiment of this application.

FIG. 19 is a schematic diagram of a format of the BGP Slow Peer Sub-TLV field according to an embodiment of this application. In FIG. 19, the BGP Slow Peer Sub-TLV field includes a Sub-Type field, a Length field, an AFI field, a SAFI field, a Reserved field, a Peer Address field, a Route Distinguisher field, a Slow Count field, a Timestamp of Last Slow End Time (second level) field, a Timestamp of Last Slow End Time (millisecond-level) field, a Timestamp of Slow Start Time (millisecond level) field, and a Timestamp of Slow Start Time (millisecond-level) field. The Sub-Type field carries a value indicating a type of the BGP Slow Peer Sub-TLV field, for example, 2. The Length field carries a total length of the value of the Sub-TLV. The AFI field carries the AFI. The SAFI field carries the SAFI. The Reserved field is reserved. The Peer Address field may occupy 16 bytes and is used to carry the address of the slow peer. The Route Distinguisher field may occupy eight bytes. When a value of the Route Distinguisher field is not 0, it identifies that the slow peer belongs to a VPN instance of the route identifier. The Slow Count field carries the number of times that the peer is considered as the slow peer. The Timestamp of Last Slow End Time field carries an end time at which the peer is recognized as the slow peer previously. The Timestamp of Slow Start Time field carries a start time at which the peer is recognized as the slow peer currently.

It should be noted that the Sub-TLV fields shown in FIG. 18 and FIG. 19 do not constitute a limitation on the health status information in this application. Persons skilled in the art may design the sub-TLV fields at discretion.

In a fourth possible implementation, the BGP information of the network device includes the security state information of the network device. The security state information of the network device is information indicating a security state of the network device, and can reflect a situation of defending the network device against an external attack.

Figure 20:
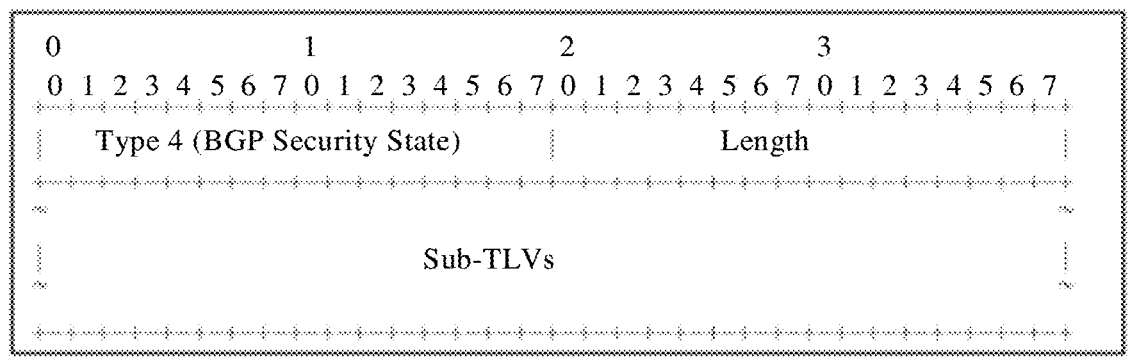
FIG. 20 is a schematic diagram of a format of a BGP Security State TLV field according to an embodiment of this application.

The security state information of the network device may be carried in a BGP security state TLV field. FIG. 20 is a schematic diagram of a format of the BGP Security State TLV field. In FIG. 20, the BGP Security State TLV field includes a type field, a length field, and a Sub-TLV field. A value of the type field may be, for example, 4, indicating that the TLV is a BGP Security State TLV. The length field may occupy two bytes, indicating a total length of one or more subsequent Sub-TLVs. The Sub-TLV field may include one or more sub-TLVs indicating the security state information of the network device.

Table 6 is an example of Sub-TLV names and specific security state information.

TABLE 6

| Sub-TLV name | Security state information |
| --- | --- |
| BGP generalized time to live security mechanism GTSM enabled (BGP GTSM Enabled) | The GTSM is enabled for a BGP session Sub-TLV name Security state information Valid time to live TTL hop count |
| BGP generalized time to live security mechanism GTSM not enabled (BGP GTSM Not Enabled) | The GTSM is not enabled for the BGP session |
| BGP authentication enabled (BGP Authentication) | Security authentication is enabled for the BGP session Authentication mode Authentication algorithm |
| BGP authentication not enabled (BGP Non-Authentication) | Security authentication is not enabled for the BGP session |
| BGP origin authentication enabled (BGP Prefix OV) | Origin authentication is enabled for the BGP session Invalid routing prefix information |
| BGP origin authentication not enabled (BGP NO Prefix OV) | Origin authentication is not enabled for the BGP session |
| BGP prefix limit (BGP Prefix Limit) | Quantity of received routing prefixes Threshold for routing prefixes allowed to be received |
| BGP peer prefix limit (BGP Peer Prefix Limit) | Quantity of received routing prefixes corresponding to the address family information |

TABLE 6-continued

| Sub-TLV name | Security state information |
| --- | --- |
| | Threshold for routing prefixes allowed to be received and corresponding to the address family information Early warning threshold for the quantity of routing prefixes corresponding to the address family information |
| BGP peer prefix limit not set (BGP No Prefix Limit) | Address family information for which no routing prefix threshold is set |
| BGP error update message ignore (BGP Update-Err ignore) | Whether an error update message ignore function is enabled |
| BGP peer error update message ignore (BGP Peer Update-Err ignore) | Whether an error update message ignore function corresponding to the address family information is enabled |
| First AS number check not enabled for BGP (BGP Not Check-First-AS) | A function of checking a first autonomous system AS number of an autonomous system path AS_Path attribute in an update message sent by an EBGP peer to the network device is not enabled |
| First AS number detection not enabled for BGP peer (BGP Peer Not Check-First-AS) | A function of checking a first autonomous system AS number of an autonomous system path AS_Path attribute in an update message sent by a first EBGP peer to the network device is not enabled for the first EBGP peer |
| AS loop allowed for BGP peer (BGP Peer Allow-AS-Loop) | A local AS number is allowed to repeatedly appear for a plurality of times |
| Inbound policy not configured for BGP (BGP No Inbound-Policy) | No inbound policy is configured for the address family |
| Outbound policy not configured for BGP (BGP No Outbound-Policy) | No outbound policy is configured for the address family |
| BGP secure socket layer policy (BGP SSL-Policy) | Secure socket layer SSL authentication is enabled |

The following describes a format of the Sub-TLV field in the BGP Security State TLV field with reference to specific security state information shown in Table 6.

In this embodiment of this application, the generalized time to live security mechanism (GTSM) is used to protect the network device against an attack initiated by an attacker. Specifically, the network device may detect whether a value of a time to live (TTL) in a packet header of an Internet Protocol (IP) packet received by the network device falls within a preset range; and if the value is not within the preset range, the network device considers the packet as an invalid packet, and may drop the packet; or if the value is within the preset range, the network device considers the packet as a valid packet, that is, the packet is successfully detected by the GTSM and can be received.

In the GTSM, a valid TTL hop count (Valid-TTL-Hops) is a maximum TTL hop count corresponding to the BGP session established between the network device and the peer. If the valid TTL hop count is exceeded, the BGP session cannot be established.

Figure 21:
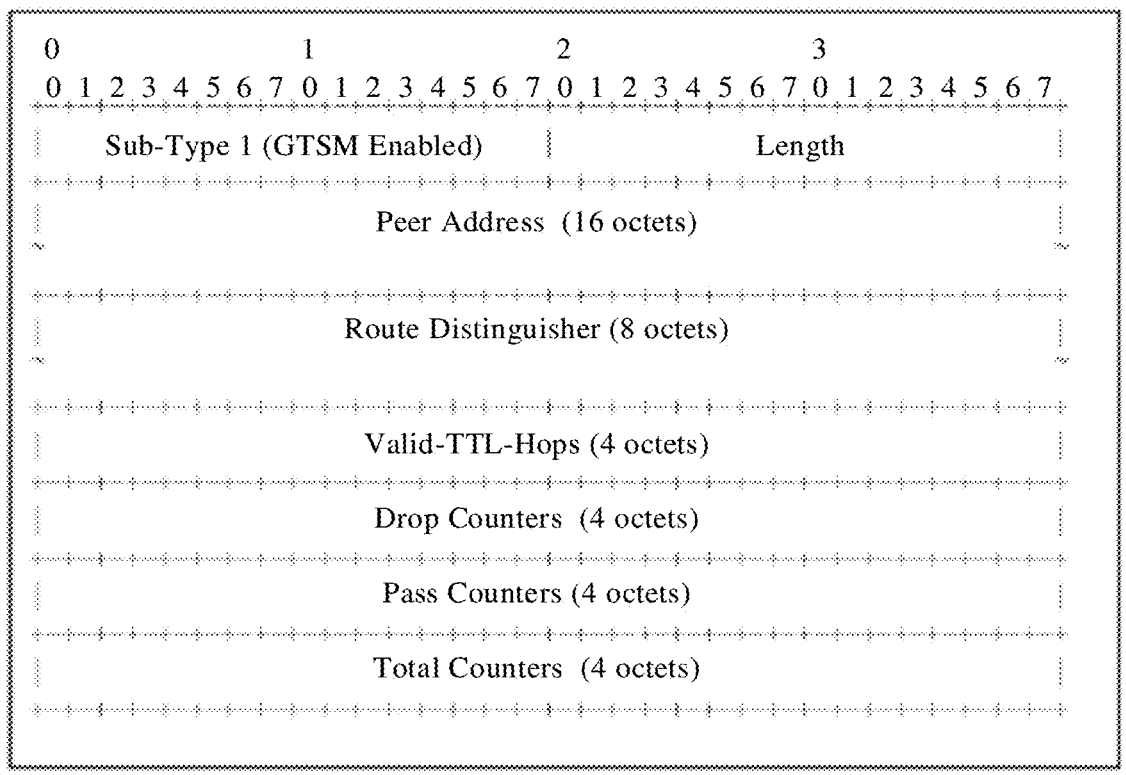
FIG. 21 is a schematic diagram of a format of a BGP GTSM Enabled Sub-TLV field according to an embodiment of this application.

FIG. 21 is a schematic diagram of a format of the BGP GTSM Enabled Sub-TLV field according to an embodiment of this application. In FIG. 21, the BGP GTSM Enabled Sub-TLV field includes a Sub-Type field, a Length field, a Peer Address field, a Route Distinguisher field, a Valid-TTL-Hops field, a Drop Counters field, and a Pass Counters field, and a Total Counters field. The Sub-Type field carries a value indicating a type of the BGP GTSM Enabled Sub-TLV field, for example, 1. The Length field carries a length of the value of the Sub-TLV field. The Peer Address field may occupy 16 bytes and is used to carry the address of the peer of the network device. The Route Distinguisher field may occupy eight bytes. When a value of the Route Distinguisher field is not 0, it identifies that the peer belongs to a VPN instance of the route identifier. The Valid-TTL-Hops field carries a count of TTL hops to be detected. The Drop Counters field carries a quantity of dropped packets. The Pass Counters field carries a quantity of passed packets. The Total Counters field carries a total quantity of received packets.

Figure 22:
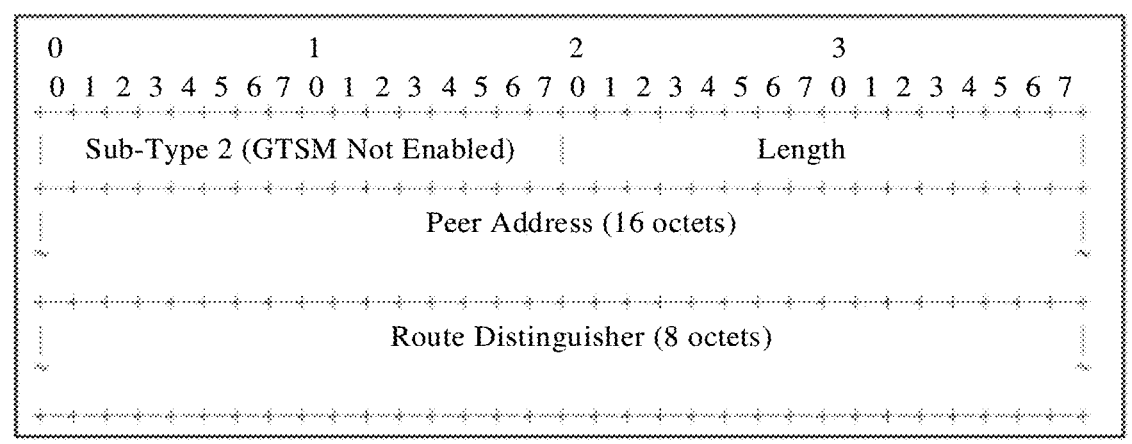
FIG. 22 is a schematic diagram of a format of a BGP GTSM Not Enabled Sub-TLV field according to an embodiment of this application.

FIG. 22 is a schematic diagram of a format of the BGP GTSM Not Enabled Sub-TLV field according to an embodiment of this application. In FIG. 22, the BGP GTSM Not Enabled Sub-TLV field includes a Sub-Type field, a Length field, a Peer Address field, and a Route Distinguisher field. The Sub-Type field carries a value indicating a type of the BGP GTSM Enabled Sub-TLV field, for example, 2. The Length field carries a length of the value of the Sub-TLV field. The Peer Address field may occupy 16 bytes and is used to carry the address of the peer of the network device. The Route Distinguisher field may occupy eight bytes. When a value of the Route Distinguisher field is not 0, it identifies that the peer belongs to a VPN instance of the route identifier.

In this embodiment of this application, BGP security authentication is used to encrypt the BGP session. Common authentication algorithms include a message digest (message digest 5, MD5) algorithm, a keychain algorithm, and the like.

Figure 23:
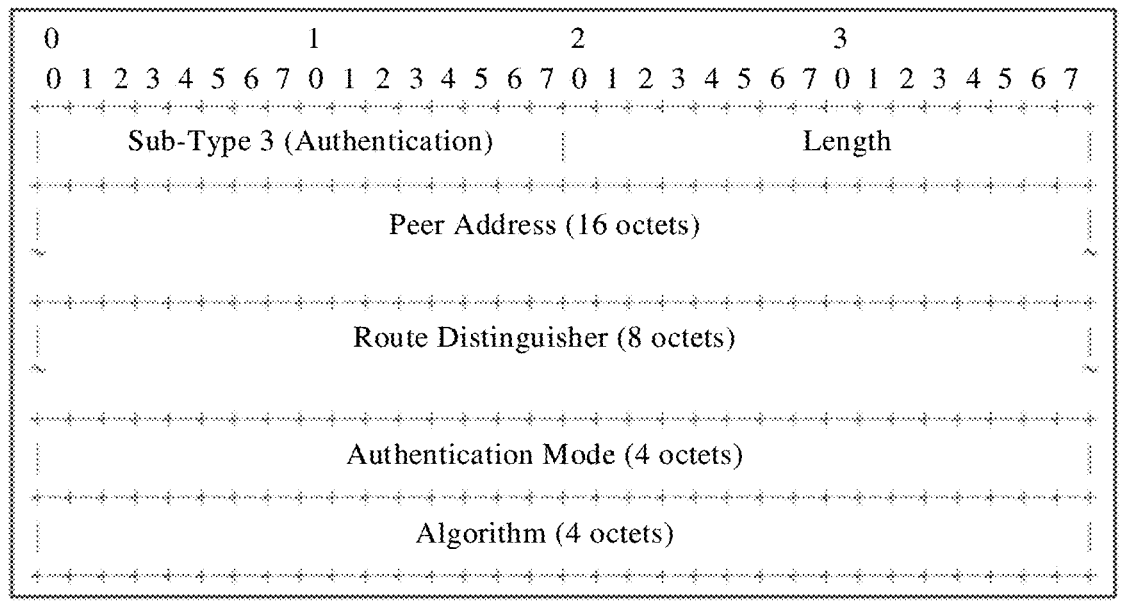
FIG. 23 is a schematic diagram of a format of a BGP Authentication Sub-TLV field according to an embodiment of this application.

FIG. 23 is a schematic diagram of a format of the BGP Authentication Sub-TLV field according to an embodiment of this application. In FIG. 23, the BGP Authentication Sub-TLV field includes a Sub-Type field, a Length field, a Peer Address field, a Route Distinguisher field, an Authentication Mode field, and an Algorithm field. The Sub-Type field is used to carry a value indicating a type of the BGP Authentication Sub-TLV field, for example, 3. The Length field carries a length of the value of the Sub-TLV field. The Peer Address field may occupy 16 bytes and is used to carry the address of the peer of the network device. The Route Distinguisher field may occupy eight bytes. When a value of the Route Distinguisher field is not 0, it identifies that the peer belongs to a VPN instance of the route identifier. The Authentication Mode field is used to carry a mode of the authentication algorithm. The Algorithm field is used to carry an identifier of the authentication algorithm. The mode of the authentication algorithm indicates whether a password sent between the network device and the peer and used for encryption is a plaintext or a ciphertext.

Figure 24:
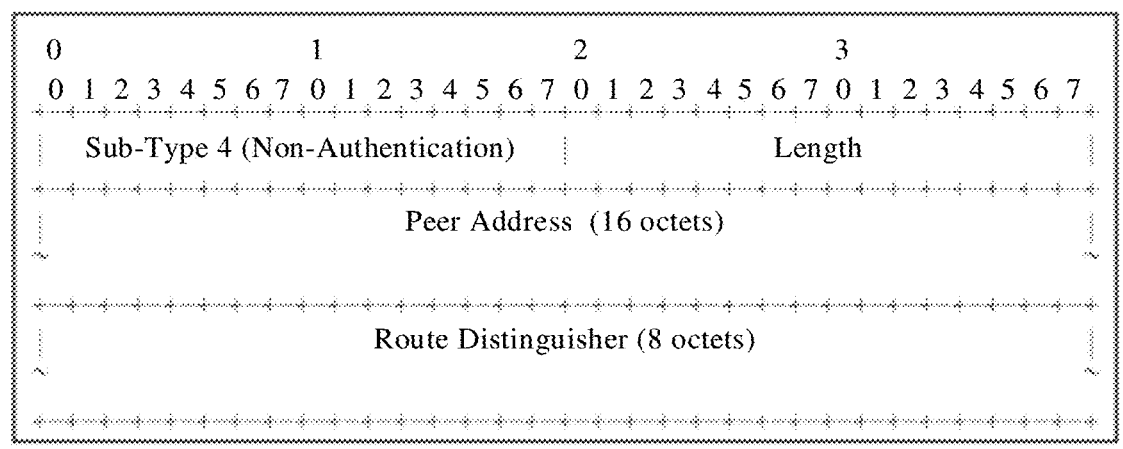
FIG. 24 is a schematic diagram of a format of a BGP Non-Authentication Sub-TLV field according to an embodiment of this application.

FIG. 24 is a schematic diagram of a format of the BGP Non-Authentication Sub-TLV field according to an embodiment of this application. In FIG. 24, the BGP Non-Authentication Sub-TLV field includes a Sub-Type field, a Length field, a Peer Address field, and a Route Distinguisher field. The Sub-Type field is used to carry a value indicating a type of the BGP Non-Authentication Sub-TLV field, for example, 4. The Length field carries a length of the value of the Sub-TLV field. The Peer Address field may occupy 16 bytes and is used to carry the address of the peer of the network device. The Route Distinguisher field may occupy eight bytes. When a value of the Route Distinguisher field is not 0, it identifies that the peer belongs to a VPN instance of the route identifier.

In this embodiment of this application, origin authentication (OV) is used to check whether a BGP routing prefix is valid. Specifically, the network device that has enabled origin authentication may obtain a correspondence between the BGP routing prefix and the autonomous system number. When the network device receives the routing prefix and the autonomous system number in the AS-Path from the BGP session, the network device may search for a corresponding autonomous system number based on the routing prefix and the correspondence. If the autonomous system number is the same as the autonomous system number in the AS-Path, the origin authentication succeeds; otherwise, the origin authentication fails.

Figure 25:
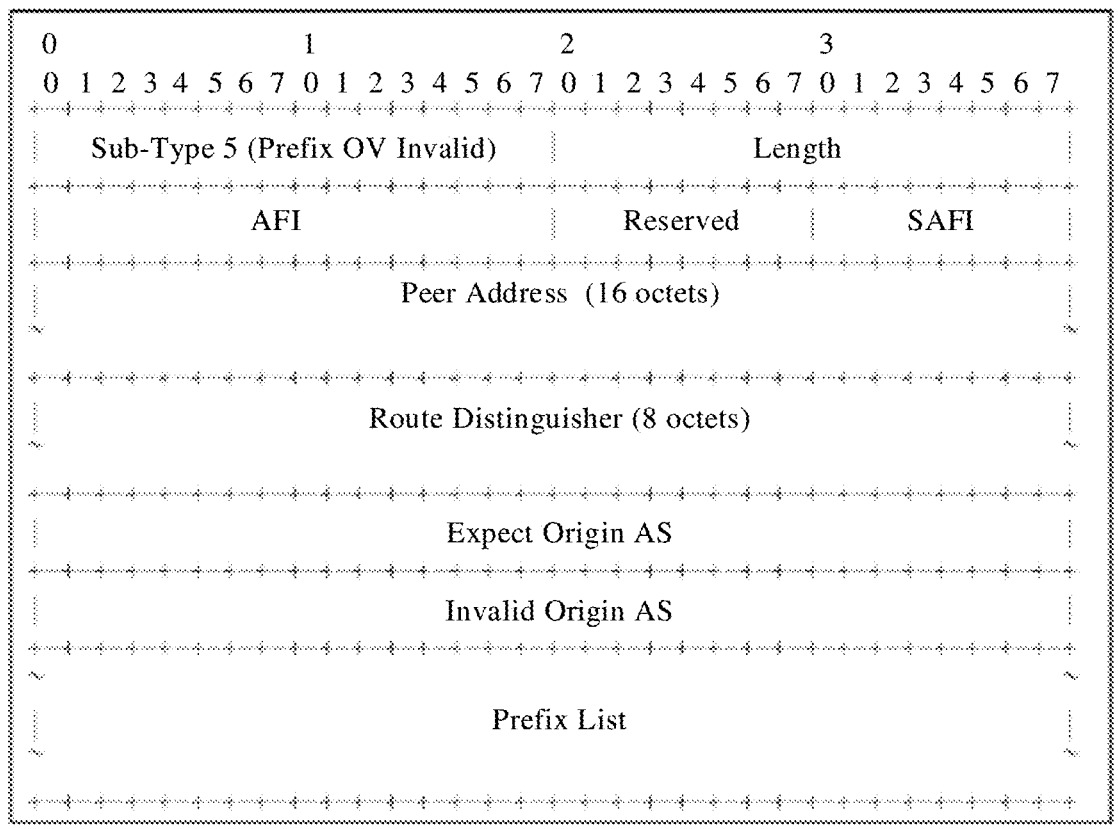
FIG. 25 is a schematic diagram of a format of a BGP Prefix OV Sub-TLV field according to an embodiment of this application.

FIG. 25 is a schematic diagram of a format of the BGP Prefix OV Sub-TLV field according to an embodiment of this application. In FIG. 25, the BGP Prefix OV Sub-TLV field includes a Sub-Type field, a Length field, an AFI field, a SAFI field, a Reserved field, a Peer Address field, a Route Distinguisher field, an Expect Origin AS field, an Invalid Origin AS field, and a Prefix List field. The Sub-Type field carries a value indicating a type of the BGP Prefix OV Sub-TLV field, for example, 5. The Length field carries a length of the value of the Sub-TLV field. The AFI field carries the AFI. The SAFI field carries the SAFI. The Reserved field carries. The Peer Address field may occupy 16 bytes and is used to carry the address of the peer of the network device. The Route Distinguisher field may occupy eight bytes. When a value of the Route Distinguisher field is not 0, it identifies that the peer belongs to a VPN instance of the route identifier. The Expect Origin AS field carries an expected start autonomous system number. The Invalid Origin AS field carries an invalid start autonomous system number. The Prefix List field carries a list of invalid routing prefixes.

Figure 26:
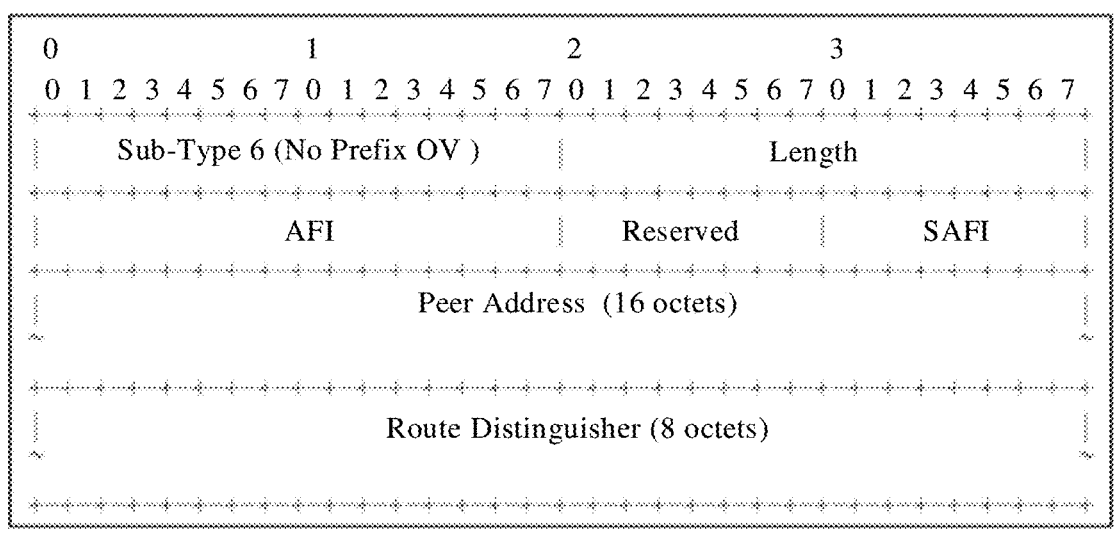
FIG. 26 is a schematic diagram of a format of a BGP NO Prefix OV Sub-TLV field according to an embodiment of this application.

FIG. 26 is a schematic diagram of a format of the BGP NO Prefix OV Sub-TLV field according to an embodiment of this application. In FIG. 26, the BGP NO Prefix OV Sub-TLV field includes a Sub-Type field, a Length field, an AFI field, a SAFI field, a Reserved field, a Peer Address field, and a Route Distinguisher field. The Sub-Type field carries a value indicating a type of the BGP NO Prefix OV Sub-TLV field, for example, 6. The Length field carries a length of the value of the Sub-TLV field. The AFI field carries the AFI. The SAFI field carries the SAFI. The Reserved field carries. The Peer Address field may occupy 16 bytes and is used to carry the address of the peer of the network device. The Route Distinguisher field may occupy eight bytes. When a value of the Route Distinguisher field is not 0, it identifies that the peer belongs to a VPN instance of the route identifier.

Figure 27:
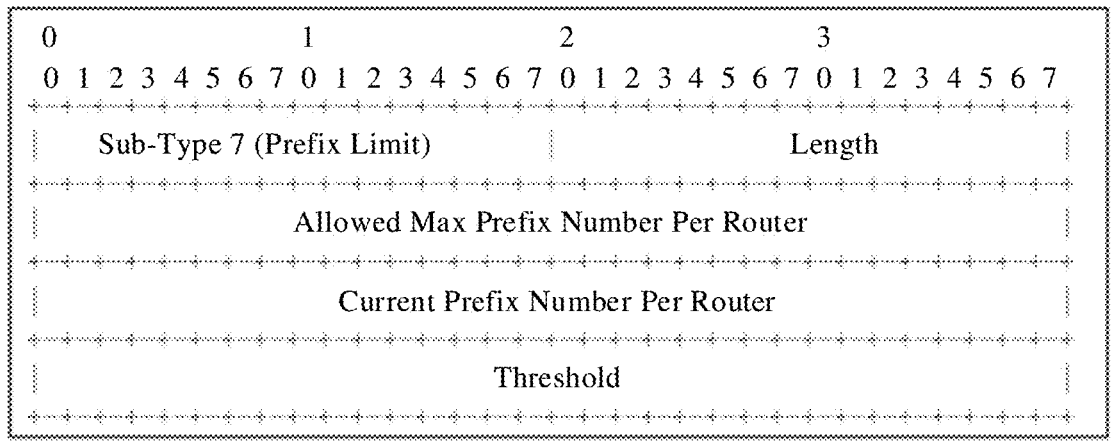
FIG. 27 is a schematic diagram of a format of a BGP Prefix Limit Sub-TLV field according to an embodiment of this application.

FIG. 27 is a schematic diagram of a format of the BGP Prefix Limit Sub-TLV field according to an embodiment of this application. In FIG. 27, the BGP Prefix Limit Sub-TLV field includes a Sub-Type field, a Length field, an Allowed Max Prefix Number Per Router field, a Current Prefix Number Per Router field, and a Threshold field. The Sub-Type field carries a value indicating a type of the BGP Prefix Limit Sub-TLV field, for example, 7. The Length field carries a length of the value of the Sub-TLV field. The Allowed Max Prefix Number Per Router field carries a threshold for routing prefixes allowed to be received by the network device. The Current Prefix Number Per Router field carries a quantity of routing prefixes received by the network device. The Threshold field carries an early warning threshold for a quantity of routing prefixes (for example, a percentage).

In this embodiment of this application, the early warning threshold for the quantity of routing prefixes may be a percentage. For example, when the early warning threshold for the quantity of routing prefixes is 90%, it indicates that an early warning needs to be given when the quantity of routing prefixes received by the network device exceeds 90% of the threshold for the routing prefixes allowed to be received. Certainly, the early warning threshold for the quantity of routing prefixes may be a specific quantity, and the specific quantity is less than the threshold for the routing prefixes allowed to be received.

Figure 28:
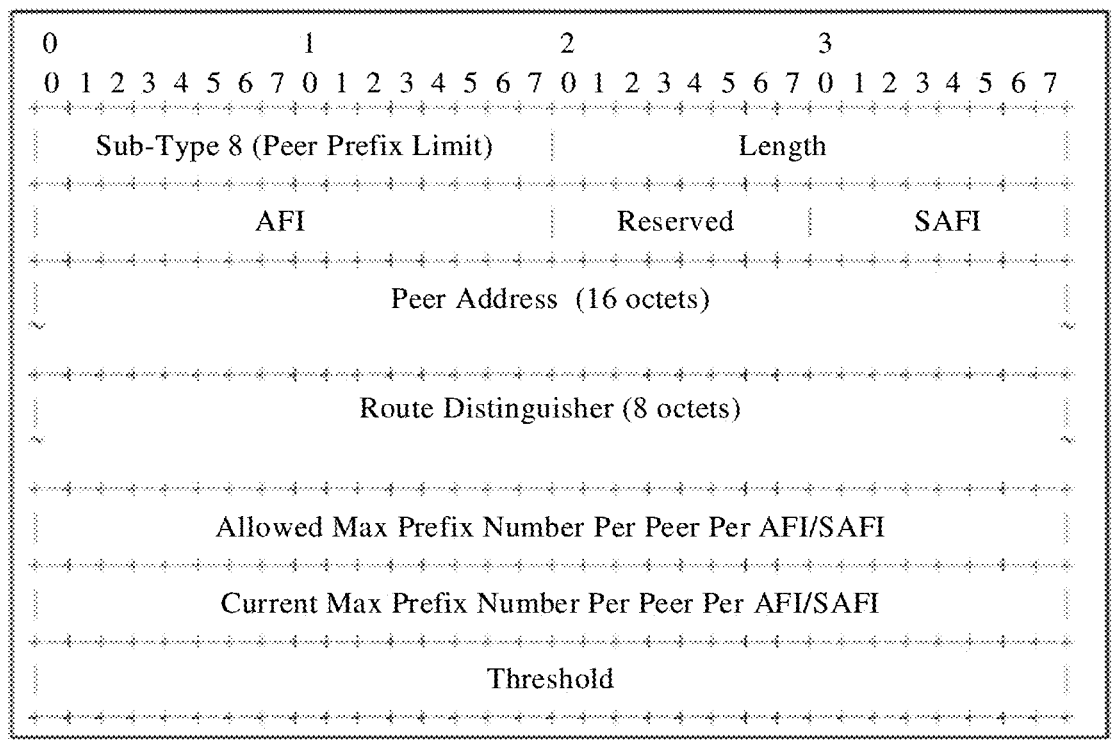
FIG. 28 is a schematic diagram of a format of a BGP Peer Prefix Limit Sub-TLV field according to an embodiment of this application.

FIG. 28 is a schematic diagram of a format of the BGP Peer Prefix Limit Sub-TLV field according to an embodiment of this application. In FIG. 28, the BGP Peer Prefix Limit Sub-TLV field includes a Sub-Type field, a Length field, an AFI field, a SAFI field, a Reserved field, a Peer Address field, a Route Distinguisher field, an Allowed Max Prefix Number Per Peer Per AFI/SAFI field, a Current Max Prefix Number Per Peer Per AFI/SAFI field, and a Threshold field. The Sub-Type field carries a value indicating a type of the BGP NO Prefix OV Sub-TLV field, for example, 8. The Length field carries a length of the value of the Sub-TLV field. The AFI field carries the AFI. The SAFI field carries the SAFI. The Reserved field carries. The Peer Address field may occupy 16 bytes and is used to carry the address of the peer of the network device. The Route Distinguisher field may occupy eight bytes. When a value of the Route Distinguisher field is not 0, it identifies that the peer belongs to a VPN instance of the route identifier. The Allowed Max Prefix Number Per Peer Per AFI/SAFI field carries a threshold for routing prefixes allowed to be received and corresponding to the address family information. The Current Max Prefix Number Per Peer Per AFI/SAFI field carries a quantity of routing prefixes received and corresponding to the address family information. The Threshold field carries the early warning threshold for the quantity of routing prefixes corresponding to the address family information.

In this embodiment of this application, the early warning threshold for the quantity of routing prefixes corresponding to the address family information may be a percentage. For example, when the early warning threshold for the quantity of routing prefixes is 90%, it indicates that an early warning needs to be given when the quantity of routing prefixes received by the network device and corresponding to the address family information exceeds 90% of the threshold for the routing prefixes allowed to be received. Certainly, the early warning threshold for the quantity of routing prefixes corresponding to the address family information may be a specific quantity, and the specific quantity is less than the threshold for the routing prefixes allowed to be received.

Figure 29:
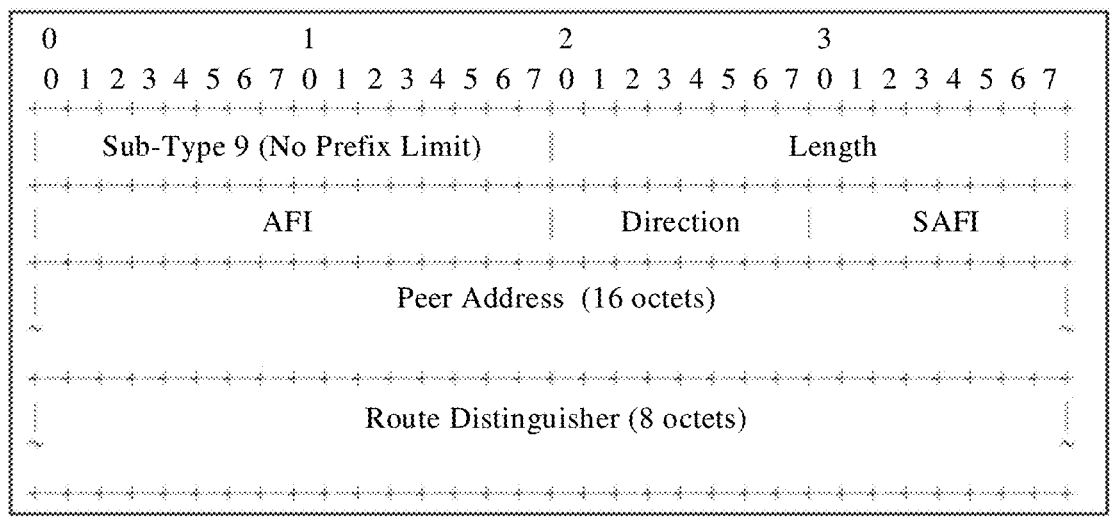
FIG. 29 is a schematic diagram of a format of a BGP No Prefix Limit Sub-TLV field according to an embodiment of this application.

FIG. 29 is a schematic diagram of a format of the BGP No Prefix Limit Sub-TLV field according to an embodiment of this application. In FIG. 29, the BGP No Prefix Limit Sub-TLV field includes a Sub-Type field, a Length field, an AFI field, a SAFI field, a Direction field, a Peer Address field, and a Route Distinguisher field. The Sub-Type field carries a value indicating a type of the BGP No Prefix Limit Sub-TLV, for example, 9. The Length field carries a length of the value of the Sub-TLV field. The AFI field carries the AFI. The SAFI field carries the SAFI. The Direction field carries a value indicating a specific packet direction of the network device in which the maximum quantity of routing prefixes is set. For example, 0 indicates a packet input direction, 1 indicates a packet output direction, and 2 indicates both directions. The Peer Address field may occupy 16 bytes and is used to carry the address of the peer of the network device. The Route Distinguisher field may occupy eight bytes. When a value of the Route Distinguisher field is not 0, it identifies that the peer belongs to a VPN instance of the route identifier.

In this embodiment of this application, an update message is a message used to advertise or withdraw BGP routing information. In a case of an error update message, the error update message ignore function may be enabled on the network device to prevent the BGP session from being interrupted.

Figure 30:
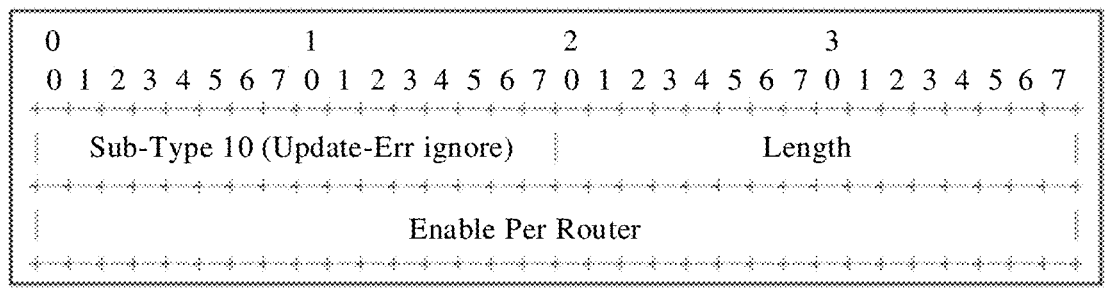
FIG. 30 is a schematic diagram of a format of a BGP Update-Err ignore Sub-TLV field according to an embodiment of this application.

FIG. 30 is a schematic diagram of a format of the BGP Update-Err ignore Sub-TLV field according to an embodiment of this application. In FIG. 30, the BGP Update-Err ignore Sub-TLV field includes a Sub-Type field, a Length field, and an Enable Per Router field. The Sub-Type field carries a value indicating a type of the BGP Update-Err ignore Sub-TLV field, for example, 10. The Length field carries a length of the value of the Sub-TLV field. The Enable Per Router field carries a value indicating whether the error update message ignore function is enabled. For example, 0 indicates that the function is disabled, and 1 indicates that the function is enabled.

Figure 31:
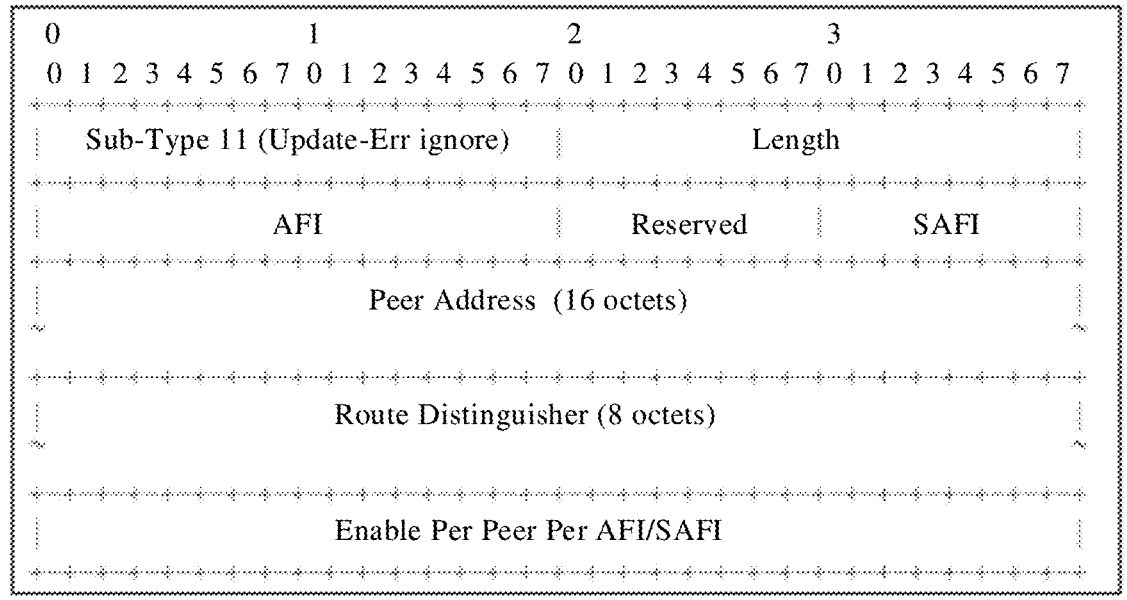
FIG. 31 is a schematic diagram of a format of a BGP Peer Update-Err ignore Sub-TLV field according to an embodiment of this application.

FIG. 31 is a schematic diagram of a format of the BGP Peer Update-Err ignore Sub-TLV field according to an embodiment of this application. In FIG. 31, the BGP Peer Update-Err ignore Sub-TLV field includes a Sub-Type field, a Length field, an AFI field, a SAFI field, a Reserved field, a Peer Address field, a Route Distinguisher field, and an Enable Per Peer Per AFI/SAFI field. The Sub-Type field carries a value indicating a type of the BGP Peer Update-Err ignore Sub-TLV field, for example, ii. The Length field carries a length of the value of the Sub-TLV field. The AFI field carries the AFI. The SAFI field carries the SAFI. The Reserved field carries. The Peer Address field may occupy 16 bytes and is used to carry the address of the peer of the network device. The Route Distinguisher field may occupy eight bytes. When a value of the Route Distinguisher field is not 0, it identifies that the peer belongs to a VPN instance of the route identifier. The Enable Per Peer Per AFI/SAFI field carries a value indicating whether an error update message ignore function corresponding to the peer information is enabled. For example, 0 indicates that the function is disabled, and 1 indicates that the function is enabled.

In this embodiment of this application, when the peer of the network device is an EBGP peer, to ensure security of the network device, the network device may check the first AS number of the AS path (AS_Path) list in the update message sent by the EBGP peer. If the first AS number belongs to an AS in which the EBGP peer is located, no loop occurs between the network device and the EBGP peer. If the first AS number does not belong to the AS in which the EBGP peer is located, there may be a risk that a routing loop occurs between the network device and the EBGP peer. In this case, the network device may reject the update message and disconnect from the EBGP peer. The routing loop is a loop formed due to cyclic sending of a route between the network device and the peer without stop.

Figure 32:
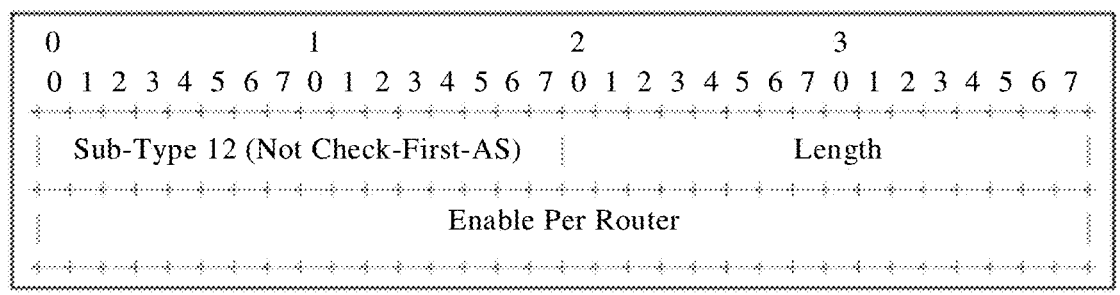
FIG. 32 is a schematic diagram of a format of a BGP Not Check-First-AS Sub-TLV field according to an embodiment of this application.

FIG. 32 is a schematic diagram of a format of the BGP Not Check-First-AS Sub-TLV field according to an embodiment of this application. In FIG. 32, the BGP Not Check-First-AS Sub-TLV field includes a Sub-Type field, a Length field, and an Enable Per Router field. The Sub-Type field carries a value indicating a type of the BGP Not Check-First-AS Sub-TLV field, for example, 12. The Length field carries a length of the value of the Sub-TLV field. The Enable Per Router field carries whether the network device enables the function of checking the first AS number of the AS_Path list in the update message sent by the EBGP peer. For example, 0 indicates that the function is disabled, and 1 indicates that the function is enabled.

Figure 33:
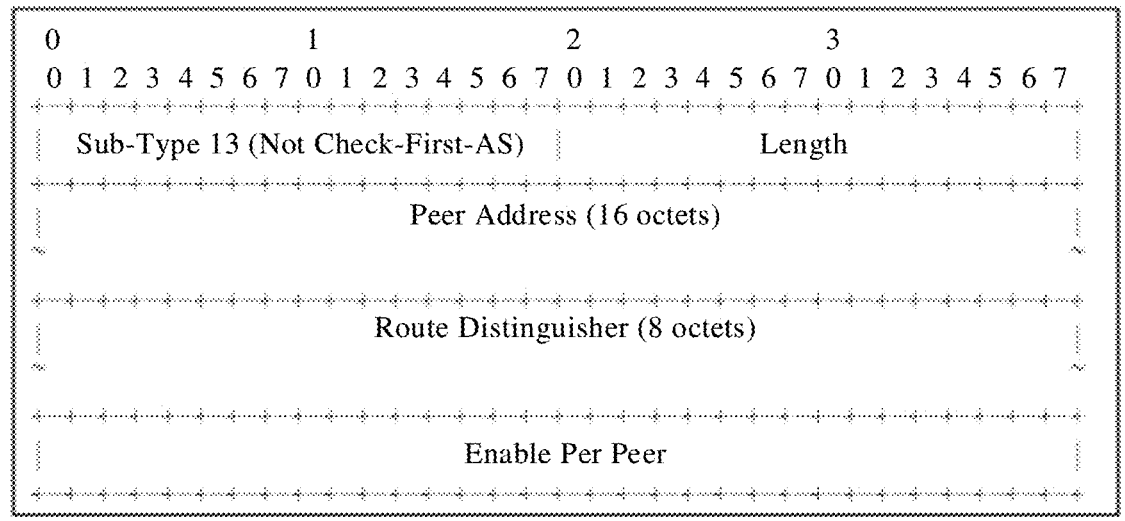
FIG. 33 is a schematic diagram of a format of a BGP Peer Not Check-First-AS Sub-TLV field according to an embodiment of this application.

FIG. 33 is a schematic diagram of a format of the BGP Peer Not Check-First-AS Sub-TLV field according to an embodiment of this application. In FIG. 33, the BGP Peer Not Check-First-AS Sub-TLV field includes a Sub-Type field, a Length field, a Peer Address field, a Route Distinguisher field, and an Enable Per Peer field. The Sub-Type field is used to carry a value indicating a type of the BGP Peer Not Check-First-AS Sub-TLV field, for example, 13. The Length field carries a length of the value of the Sub-TLV field. The Peer Address field may occupy 16 bytes and is used to carry the address of the peer of the network device. The Route Distinguisher field may occupy eight bytes. When a value of the Route Distinguisher field is not 0, it identifies that the peer belongs to a VPN instance of the route identifier. The Enable Per Peer field is used to carry whether the network device enables the function of checking the first AS number of the AS_Path list in the update message sent by the first EBGP peer for the first EBGP peer. For example, 0 indicates that the function is disabled, and 1 indicates that the function is enabled. The first EBGP peer is any one of EBGP peers.

Figure 34:
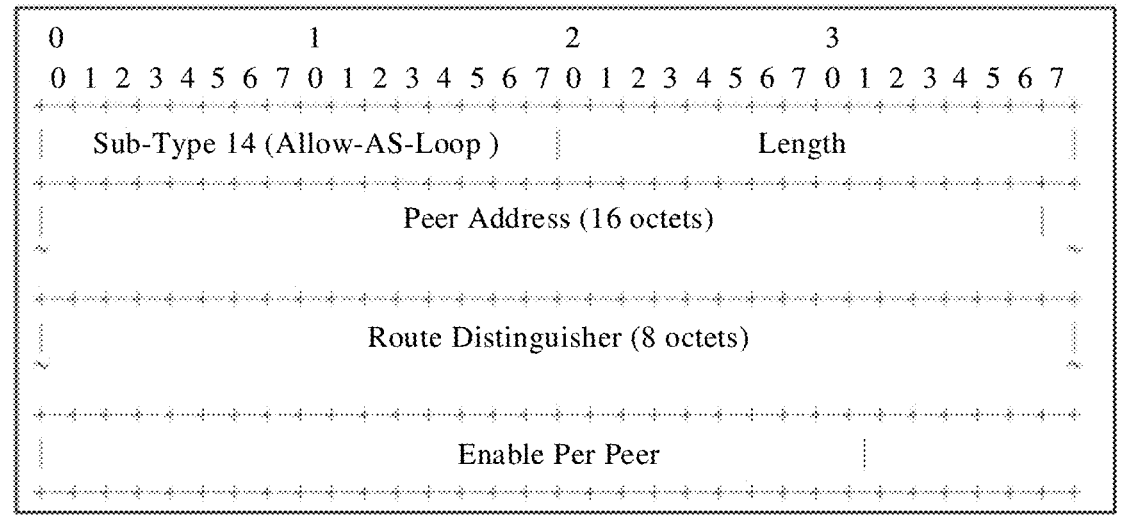
FIG. 34 is a schematic diagram of a format of a BGP Peer Allow-AS-Loop Sub-TLV field according to an embodiment of this application.

FIG. 34 is a schematic diagram of a format of the BGP Peer Allow-AS-Loop Sub-TLV field according to an embodiment of this application. In FIG. 34, the BGP Peer Allow-AS-Loop Sub-TLV field includes a Sub-Type field, a Length field, a Peer Address field, a Route Distinguisher field, and an Enable Per Peer field. The Sub-Type field is used to carry a value indicating a type of the BGP Peer Allow-AS-Loop Sub-TLV field, for example, 14. The Length field carries a length of the value of the Sub-TLV field. The Peer Address field may occupy 16 bytes and is used to carry the address of the peer of the network device. The Route Distinguisher field may occupy eight bytes. When a value of the Route Distinguisher field is not 0, it identifies that the peer belongs to a VPN instance of the route identifier. The Enable Per Peer field is used to carry whether the network device enables the function of allowing the local AS number to repeatedly appear for a plurality of times. For example, 0 indicates that the function is disabled, and 1 indicates that the function is enabled. If the function is enabled, a risk that a routing loop occurs on the network device is high.

In this embodiment of this application, an inbound policy is a control policy for receiving routing information sent by the peer. If no inbound policy is configured for the BGP session of the network device, the received routing information may not be restricted. When the peer suddenly sends a large quantity of invalid routes, normal running of the network device may be severely affected.

Figure 35:
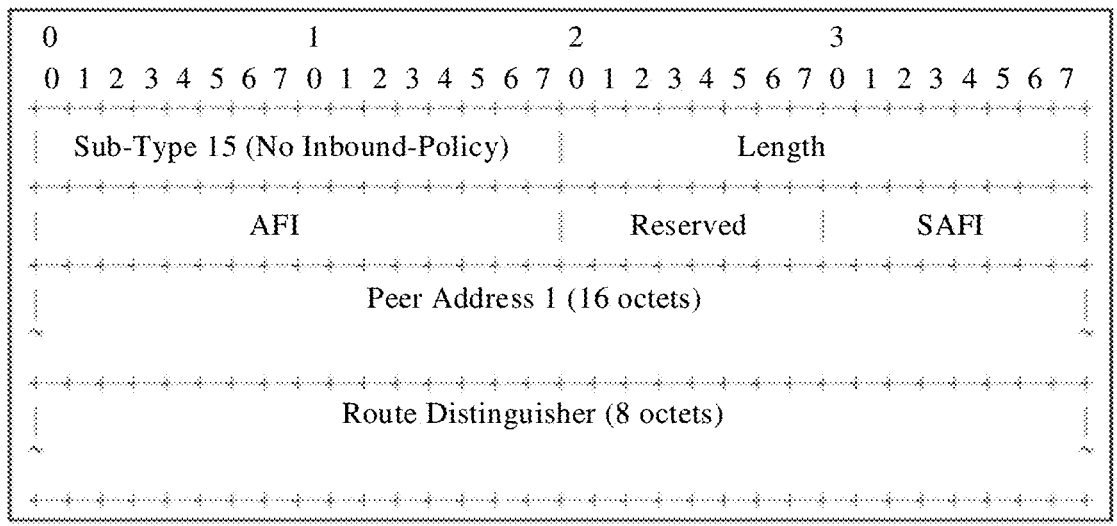
FIG. 35 is a schematic diagram of a format of a BGP No Inbound-Policy Sub-TLV field according to an embodiment of this application.

FIG. 35 is a schematic diagram of a format of the BGP No Inbound-Policy Sub-TLV field according to an embodiment of this application. In FIG. 35, the BGP No Inbound-Policy Sub-TLV field includes a Sub-Type field, a Length field, an AFI field, a SAFI field, a Reserved field, a Peer Address field, and a Route Distinguisher field. The Sub-Type field carries a value indicating a type of the BGP No Inbound-Policy Sub-TLV field, for example, 15. The Length field carries a length of the value of the Sub-TLV field. The AFI field carries the AFI. The SAFI field carries the SAFI. The Reserved field carries. The Peer Address field may occupy 16 bytes and is used to carry the address of the peer of the network device. The Route Distinguisher field may occupy eight bytes. When a value of the Route Distinguisher field is not 0, it identifies that the peer belongs to a VPN instance of the route identifier.

In this embodiment of this application, an outbound policy is a control policy for sending routing information to the peer. If no outbound policy is configured for the BGP session of the network device, the network device may send routes externally without limit, and there is a risk that normal running of the entire network is affected.

Figure 36:
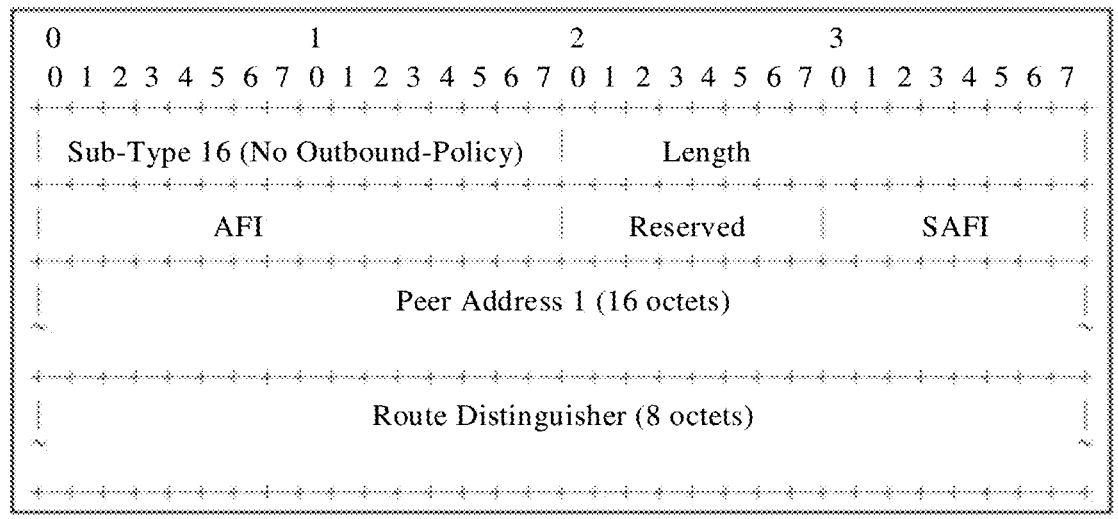
FIG. 36 is a schematic diagram of a format of a BGP No Outbound-Policy Sub-TLV field according to an embodiment of this application.

FIG. 36 is a schematic diagram of a format of the BGP No Outbound-Policy Sub-TLV field according to an embodiment of this application. In FIG. 36, the BGP No Outbound-Policy Sub-TLV field includes a Sub-Type field, a Length field, an AFI field, a SAFI field, a Reserved field, a Peer Address field, and a Route Distinguisher field. The Sub-Type field carries a value indicating a type of the BGP No Outbound-Policy Sub-TLV field, for example, 16. The Length field carries a length of the value of the Sub-TLV field. The AFI field carries the AFI. The SAFI field carries the SAFI. The Reserved field carries. The Peer Address field may occupy 16 bytes and is used to carry the address of the peer of the network device. The Route Distinguisher field may occupy eight bytes. When a value of the Route Distinguisher field is not 0, it identifies that the peer belongs to a VPN instance of the route identifier.

In this embodiment of this application, the secure socket layer (Secure Sockets Layer, SSL) protocol is a security protocol provided on a basis of the Internet to ensure privacy. In SSL authentication, the SSL protocol is used to encrypt a packet to ensure data transmission security.

Figure 37:
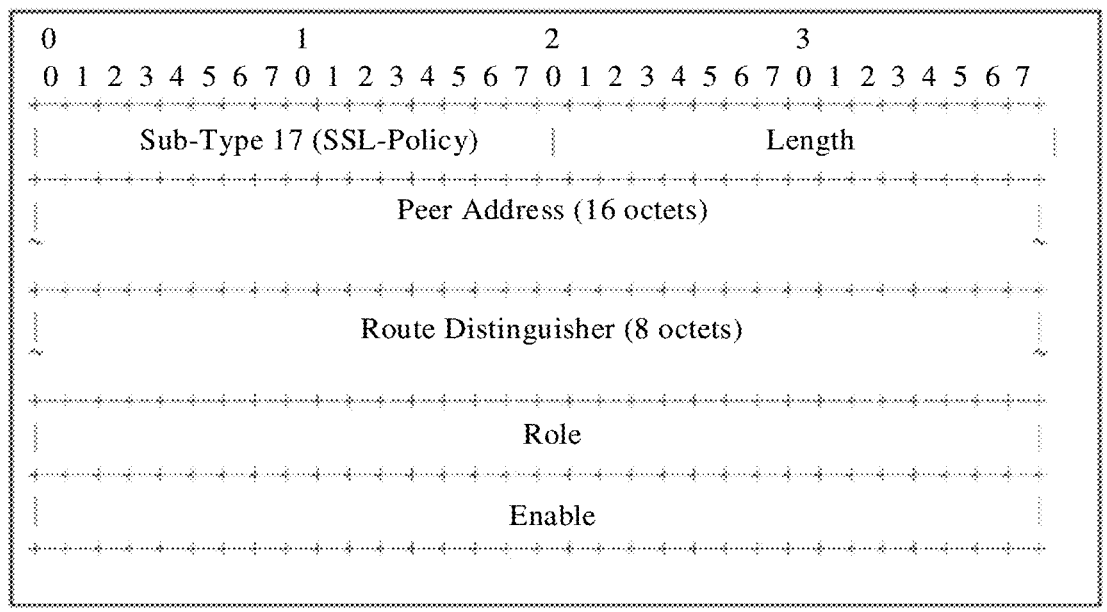
FIG. 37 is a schematic diagram of a format of a BGP SSL-Policy Sub-TLV field according to an embodiment of this application.

FIG. 37 is a schematic diagram of a format of the BGP SSL-Policy Sub-TLV field according to an embodiment of this application. In FIG. 37, the BGP SSL-Policy Sub-TLV field includes a Sub-Type field, a Length field, a Peer Address field, a Route Distinguisher field, a role field, and an Enable field. The Sub-Type field is used to carry a value indicating a type of the BGP SSL-Policy Sub-TLV field, for example, 17. The Length field carries a length of the value of the Sub-TLV field. The Peer Address field may occupy 16 bytes and is used to carry the address of the peer of the network device. The Route Distinguisher field may occupy eight bytes. When a value of the Route Distinguisher field is not 0, it identifies that the peer belongs to a VPN instance of the route identifier. The Role field is used to carry a role corresponding to the network device in the SSL protocol. For example, 1 is a client, and 2 is a server. The Enable field is used to carry whether the network device enables SSL authentication.

It may be understood that the specific security state information does not constitute a limitation on the technical solution of this application. Persons skilled in the art may design the security state information at discretion based on a specific situation.

S103. The first device receives the BMP notification message from the network device.

S104. The first device performs corresponding processing based on the BGP information of the network device in the BMP notification message.

As mentioned above, the BGP information includes one or more of the address family monitoring information of the network device, the resource information of the network device, the health status information of the network device, the security state information of the network device, and the like. The first device may use different processing manners based on different types of BGP information.

1. The BGP information includes the address family monitoring information of the network device.

Specifically, when the address family monitoring information includes the address family information and the first indication, the first device may display or notify the address family information and the first indication to related personnel by using a short message, an email, or the like, so that the related personnel know for which address family information monitoring needs to be enabled by the network device and for which address family information monitoring needs to be disabled, and then perform corresponding determining processing.

Optionally, the address family monitoring information of the network device may further include a routing message type. Similarly, the first device may display or notify the address family information, the first indication, and the routing message type to the related personnel by using a short message, an email, or the like, so that the related personnel know for which type of routing message of which address family information monitoring needs to be enabled by the network device and for which type of routing message of which address family information monitoring needs to be disabled, and then perform corresponding determining processing.

When the address family monitoring information further includes the configuration state corresponding to the address family information, the first device may detect, based on the address family information, the first indication, and the configuration state, whether the network device is faulty.

Specifically, after a connection between the network device and the peer is established, the network device may configure address family information for the peer, and notify, by using an open message, the peer of the address family information configured by the network device for the peer, and vice versa. The network device may obtain, based on the Open Message sent to each other, the first configuration state or the second configuration state corresponding to the address family information.

For example, it is assumed that a peer 190.94.251.48 is configured on the network device, where 190.94.251.48 is an address of the peer. Correspondingly, a peer 190.201.164.32 is configured on the peer, where 190.201.164.32 is an address of the network device.

Table 7 shows address family information configured by the network device for the peer 190.94.251.48 and address family information configured by the peer for the peer 190.201.164.32.

TABLE 7

| Address family information configured by the network device for the peer 190.94.251.48 | Address family information configured by the peer for the peer 190.201.164.32 |
|---|---|
| 1. AFI = 1 and SAFI = 1<br>2. AFI = 1 and SAFI = 2<br>3. AFI = 1 and SAFI = 128<br>4. AFI = 1 and SAFI = 133 | 1. AFI = 1 and SAFI = 1;<br>2. AFI = 1 and SAFI = 2; |

For meanings of AFI=1 and SAFI=1, AFI=1 and SAFI=2, and AFI=1 and SAFI=128, refer to the foregoing description. AFI=1 and SAFI=133 are address family information in the IPv4 flow specification (Flowspec).

It can be learned from Table 7 that the address family information included in the Open Message sent by the network device to the peer whose address is 190.94.251.48 is AFI=1 and SAFI=1, AFI=1 and SAFI=2, AFI=1 and SAFI=128, and AFI=1 and SAFI=133. Address family information included in the Open Message sent by the peer to the network device is AFI=1 and SAFI=1, and AFI=1 and SAFI=2. In other words, the address family information configured by the network device for the peer and the address family information configured by the peer for the network device both include two pieces of address family information: AFI=1 and SAFI=1, and AFI=1 and SAFI=2. In this case, according to the foregoing definition of the configuration state and Table 1, configuration states corresponding to AFI=1 and SAFI=1, and AFI=1 and SAFI=2 are both the first configuration state, and a configuration state corresponding to AFI=1 and SAFI=128 is the second configuration state.

Because the configuration states corresponding to AFI=1 and SAFI=1, and AFI=1 and SAFI=2 are both the first configuration state, the network device and the peer may separately establish BGP sessions corresponding to the two pieces of address family information. In a normal case, the network device sends, to the first device, a route monitoring (Route Monitoring, RM) message corresponding to the two pieces of address family information, where the RM message carries routing information corresponding to the two pieces of address family information.

When the BMP notification message received by the first device includes that a first indication corresponding to a piece of address family information is monitoring enabled, and a corresponding configuration state is the first configuration state, that is, both the network device and the peer have configured the address family information, if the first device can receive an RM message corresponding to the address family information, it indicates that the network device runs normally; or if the first device does not receive the RM message corresponding to the address family information, it indicates that the network device is faulty. In this case, the first device may perform specific fault analysis with reference to the following health status message.

For example, in the BMP notification message received by the first device, a first indication corresponding to AFI=1 and SAFI=1 indicates that monitoring is enabled, and the corresponding configuration state is the first configuration state. In this case, if the first device can receive an RM message corresponding to AFI=1 and SAFI=1 within a preset time period, it indicates that the network device runs normally; or if the first device does not receive an RM message corresponding to AFI=1 and SAFI=1 within a preset time period, it indicates that the network device is faulty. For example, a fault may occur in sending and receiving of IPv4 unicast routing information corresponding to AFI=1 and SAFI=1 on the network device. In this case, the foregoing BGP health status information may be obtained to analyze whether the message queue of the BGP session is faulty.

When the BMP notification message received by the first device includes that a first indication corresponding to a piece of address family information is monitoring enabled, and a corresponding configuration state is the second configuration state, that is, the network device has configured the address family information and the peer of the network device has not configured the address family information, it indicates that the configuration of the network device is incorrect or that the configuration of the peer is incorrect. If the configuration of the network device is incorrect, the first device may send a deletion instruction to the network device, where the deletion instruction is used to delete the address family information configured by the network device, to resolve a problem that the configuration of the network device is incorrect; or if the configuration of the peer is incorrect, the first device may send a configuration instruction to the peer, where the configuration instruction is used to configure the address family information in the peer.

For example, in the BMP notification message received by the first device, a first indication corresponding to AFI=1 and SAFI=128 is monitoring enabled, and a corresponding configuration state is the second configuration state. In this case, the first device may send a first deletion instruction to the network device to delete AFI=1 and SAFI=128 configured by the network device, to resolve a problem that the configuration of the network device is incorrect; or the first device may send a configuration instruction to the peer, where the configuration instruction is used to configure AFI=1 and SAFI=128 in the peer.

When the BMP notification message received by the first device includes that a first indication corresponding to a piece of address family information is monitoring enabled, and a corresponding configuration state is the third configuration state, that is, the network device has not configured the address family information, it indicates that the configuration of the network device is incorrect, or that the configuration of the peer is incorrect, or that a monitoring configuration of the network device is incorrect. The first device may send a configuration instruction to the network device, where the configuration instruction is used to configure the address family information in the network device, to resolve a problem that the configuration of the network device is incorrect. If the peer has configured the address family information, the first device may further send a deletion instruction to the peer, where the deletion instruction is used to delete the address family information configured by the peer, to resolve a problem that the configuration of the peer is incorrect. The first device may further send a deletion instruction to the network device, where the deletion instruction is used to delete the first indication corresponding to the address family information, to resolve a problem that the monitoring configuration of the network device is incorrect. Alternatively, the first device may determine whether monitoring has been enabled for the address family information. If yes, it indicates that link congestion may occur between the network device and the first device, and an information loss may occur. In this case, a link bandwidth between the first device and the network device may be increased.

For example, when a first indication corresponding to AFI=2 and SAFI=1 in the BMP notification message received by the first device is monitoring enabled, but it can be learned from Table 7 that the network device does not configure the address family information, therefore, a configuration state corresponding to the address family information is the third configuration state. In this case, the first device may send a configuration instruction to the network device, to configure AFI=2 and SAFI=1 in the network device; or the first device sends a deletion instruction to the network device, to delete a configuration entry corresponding to AFI=2 and SAFI=1 in Table 1.

It may be understood that the foregoing manner of processing the address family monitoring information does not constitute a limitation on this application. Persons skilled in the art may design the processing manner at discretion based on a specific situation.

2. The BGP information includes the resource information of the network device.

Specifically, when the resource information of the network device includes the quantity of used BGP sessions, the first device may determine whether the quantity of used BGP sessions is greater than or equal to a threshold. If yes, it indicates that the network device has heavy load, and the first device may adjust a service flow corresponding to the BGP session. The threshold may be determined based on the total quantity of BGP sessions supported by the network device. For example, in FIG. 9, when a value of the Used Total Number field is greater than or equal to a value of the Allowed Total Number field, it indicates that the network device has heavy load, and the first device may adjust the service flow corresponding to the BGP session. When a ratio of a value of the Used Number of IBGP Peer Session field to a value of the Used Number of EBGP Peer Session field exceeds a threshold, the service flow corresponding to the IBGP session can be adjusted; or when a ratio of a value of the Used Number of IBGP Peer Session field to a value of the Used Number of EBGP Peer Session field is lower than a threshold, the service flow corresponding to the EBGP session can be adjusted.

In this embodiment of this application, an implementation of adjusting the service flow corresponding to the BGP session may be migrating the service flow from the network device to another network device. For example, the first device may send a deletion instruction to a network device A, where the deletion instruction is used to delete one or more BGP sessions of the network devices A; in addition, the first device sends an establishment instruction to a network device B, where the establishment instruction is used to establish a BGP session on the network device B, and the BGP session is used to transmit a service flow of the BGP session of the network device A. Certainly, the manner of migrating the service flow is merely an example, and does not constitute a limitation on this application.

When the resource information of the network device includes the quantity of used BGP instances, the first device may determine whether the quantity of used BGP instances is greater than or equal to a threshold. If yes, it indicates that the network device has heavy load, and the first device may adjust a service flow corresponding to the BGP instance. The threshold may be determined based on the total quantity of BGP instances supported by the network device. For example, in FIG. 10, when a value of the Used Total Number field is greater than or equal to a value of the Allowed Total Number field, the first device adjusts the service flow corresponding to the BGP instance.

In this embodiment of this application, an implementation of adjusting the service flow corresponding to the BGP instance may be migrating the service flow from the network device to another network device. For example, the first device may send a deletion instruction to the network device A, where the deletion instruction is used to delete one or more BGP instances of the network device A; in addition, the first device sends an establishment instruction to the network device B, where the establishment instruction is used to establish a BGP instance on the network device B, and the BGP instance is used to transmit a service flow of the BGP instance of the network device A. Certainly, the manner of migrating the service flow is merely an example, and does not constitute a limitation on this application.

When the resource information of the network device includes the quantity of used BGP routing entries, the first device may determine whether the quantity of used BGP routing entries exceeds a threshold. If yes, it indicates that the network device has heavy load, and the first device may adjust a service flow corresponding to the BGP routing entry. The threshold may be determined based on the total quantity of BGP routing entries supported by the network device. For example, in FIG. 11, when a value of the Used Total Number field is greater than or equal to a value of the Allowed Total Number field, the first device adjusts the service flow corresponding to the BGP routing entry.

In this embodiment of this application, an implementation of adjusting the service flow corresponding to the BGP routing entry may be migrating the service flow from the network device to another network device. For example, the first device may send a deletion instruction to the network device A, where the deletion instruction is used to delete one or more BGP routing entries of the network device A; in addition, the first device sends an establishment instruction to the network device B, where the establishment instruction is used to establish a BGP routing entry on the network device B, and the BGP routing entry is used to transmit a service flow corresponding to the BGP routing entry of the network device A. Certainly, the manner of migrating the service flow is merely an example, and does not constitute a limitation on this application.

When the resource information of the network device includes the quantity of BGP routing entries corresponding to the address family information, the first device may determine whether the quantity of BGP routing entries corresponding to the address family information exceeds a threshold. If yes, it indicates that the network device has heavy load, and the first device may adjust a service flow corresponding to the BGP routing entry. For example, in FIG. 12, when a value of the Used Number of Per AFI/SAFI field is greater than or equal to a threshold, the first device adjusts the service flow corresponding to the BGP routing entry corresponding to the AFI field and the SAFI field on the network device. Alternatively, the first device may determine, based on the quantity of BGP routing entries corresponding to the address family information, a proportion of routing entries corresponding to each address family to used BGP routing entries, and if the proportion exceeds a threshold, adjust a service flow corresponding to the address family. For example, the first device may determine whether a ratio of a value of the Used Number of Per AFI/SAFI field to a value of the Used Total Number field in FIG. 11 exceeds a threshold, and if yes, adjust the service flow corresponding to the BGP routing entry corresponding to the AFI field and the SAFI field in FIG. 12.

When the resource information of the network device includes the quantity of BGP routing entries delivered to the forwarding entries, the first device may determine whether the quantity of forwarding entries exceeds a threshold. If yes, it indicates that the network device has heavy load, and the first device may adjust a service flow corresponding to the BGP forwarding entry on the network device. The threshold may be determined based on the total quantity of forwarding entries supported by the network device. For example, in FIG. 13, when a value of the Used Total Number field is greater than or equal to a value of the Allowed Total Number field, the first device adjusts the service flow corresponding to the BGP forwarding entry. In this embodiment of this application, a manner of adjusting the service flow corresponding to the BGP forwarding entry on the network device by the first device is similar to the manner of adjusting the service flow corresponding to the BGP routing entry. Details are not described herein again.

When the resource information of the network device includes the quantity of BGP forwarding entries corresponding to the address family information, the first device may determine whether the quantity of BGP forwarding entries corresponding to the address family information exceeds a threshold. If yes, it indicates that the network device has heavy load, and the first device may adjust a service flow corresponding to the BGP forwarding entry. For example, in FIG. 14, when a value of the Used Number of Per AFI/SAFI field is greater than or equal to a threshold, the first device adjusts the service flow corresponding to the BGP forwarding entry corresponding to the AFI field and the SAFI field on the network device. Alternatively, the first device may determine, based on the quantity of BGP forwarding entries corresponding to the address family information, a proportion of forwarding entries corresponding to each address family to used BGP forwarding entries, and if the proportion exceeds a threshold, adjust a service flow corresponding to the address family. For example, the first device may determine whether a ratio of a value of the Used Number of Per AFI/SAFI field in FIG. 14 to a value of the Used Total Number field in FIG. 13 exceeds a threshold, and if yes, adjust the service flow corresponding to the BGP forwarding entry corresponding to the AFI field and the SAFI field in FIG. 14.

When the resource information of the network device includes the used memory size, the first device may determine whether the used memory size exceeds a threshold. If yes, it indicates that the network device has heavy load, and the first device may adjust a service flow on the network device. The threshold may be determined based on the total memory size of the network device. For example, in FIG. 15, when a value of the Used Total Number field is greater than or equal to a value of the Allowed Total Number field, the first device adjusts the service flow on the network device.

When the resource information of the network device includes the used memory size corresponding to the address family information, the first device may determine whether the used memory size corresponding to the address family information exceeds a threshold. If yes, it indicates that the network device has heavy load, and the first device may adjust a service flow on the network device. For example, in FIG. 16, when a value of the Used Size Per AFI/SAFI field is greater than or equal to a threshold, the first device adjusts the service flow on the network device. Alternatively, the first device may determine, based on the used memory size corresponding to the address family information, a proportion of the memory size corresponding to each address family to the total used memory size, and if the proportion exceeds a threshold, adjust a service flow corresponding to the address family. For example, the first device may determine whether a ratio of a value of the Used Size Per AFI/SAFI field in FIG. 16 to a value of the Used Total Number field in FIG. 15 exceeds a threshold, and if yes, adjust the service flow corresponding to the AFI field and the SAFI field in FIG. 16.

It may be understood that the foregoing manner of processing the resource information does not constitute a limitation on this application. Persons skilled in the art may design the processing manner at discretion based on a specific situation.

3. The BGP information includes the health status information of the network device.

When the health status information of the network device includes the message backlog information of the message queue, the first device may determine a health status of the message queue of the network device based on the message backlog information. If the message backlog in the message queue is severe, the first device may adjust a service flow to reduce the load of the network device, or check whether the message queue is faulty.

For example, in FIG. 18, when a value of the Current Number in InQ field is greater than or equal to a product of a value of the Allowed Max Number of InQ field and a value of the Alarm Threshold for InQ field, it indicates that the backlog in the message input queue of the network device is severe, and the first device may generate an alarm or adjust a service flow input to the network device.

For another example, in FIG. 18, when a value of the Current Number in OutQ field is greater than or equal to a product of a value of the Allowed Max Number of OutQ field and a value of the Alarm Threshold for OutQ field, it indicates that the backlog in the message output queue of the network device is severe, and the first device may generate an alarm or adjust a service flow output by the network device.

When the health status information of the network device includes the information about the slow peer corresponding to the address family information, the first device may determine, based on the number of times that the peer is recognized as the slow peer, whether the peer or a link between the network device and the peer is faulty. For example, when a value of the Slow Count field in FIG. 19 is greater than or equal to a threshold, the first device may generate an alarm or check whether the peer or a link between the first device and the peer is faulty. The first device may further determine, based on a time at which the peer is recognized as the slow peer, whether the peer or the link between the first device and the peer is faulty. For example, when a difference between a value of the Timestamp of Last Slow End Time field and a value of the Timestamp of Slow Start Time field in FIG. 19 is greater than or equal to a threshold, the first device may generate an alarm or check whether the peer or the link between the first device and the peer is faulty.

It may be understood that the foregoing manner of processing the health status information does not constitute a limitation on this application. Persons skilled in the art may design the processing manner at discretion based on a specific situation.

4. The BGP information includes the security state information of the network service.

When the security state information of the network device includes that the GTSM is enabled for the BGP session, the first device may determine whether the valid time to live TTL hop count is appropriate. Specifically, the first device may determine, based on a ratio of the quantity of dropped packets to the total quantity of received packets, and/or a ratio of the quantity of passed packets to the total quantity of received packets, whether the valid time to live TTL hop count is appropriate. For example, in FIG. 21, when a ratio of a value of the Drop Counters field to a value of the Total Counters field is less than or equal to a threshold, and/or a ratio of a value of the Pass Counters field to a value of the Total Counters field is greater than or equal to a threshold, it is considered that an excessively large value is set for Valid-TTL-Hops, and the first device may decrease the value of Valid-TTL-Hops, and send an adjusted value of Valid-TTL-Hops to the network device.

When the security state information of the network device includes that the GTSM is not enabled for the BGP session, a risk that the network device is attacked is high, and the first device may deliver an enable instruction to the network device, where the enable instruction is used to instruct the network device to enable the GTSM.

When the security state information of the network device includes that security authentication is enabled for the BGP session, the first device may determine, based on the authentication mode and/or the authentication algorithm, whether the security authentication of the network device meets a security requirement.

When the security state information of the network device includes that security authentication is not enabled for the BGP session, there is a high possibility that a packet sent by the first device is intercepted and cracked. Therefore, the first device may send an enable instruction to the network device, where the enable instruction is used to instruct the network device to enable security authentication.

When the security state information of the network device includes that origin authentication is enabled for the BGP session, the first device may determine, based on the invalid routing prefix information obtained by the network device through origin authentication, which is a really invalid routing prefix and which is an incorrectly determined routing prefix. If a routing prefix is incorrectly determined, the first device may deliver an enable instruction to the network device, where the enable instruction is used to enable the incorrectly determined routing prefix. For example, the first device may further determine a really invalid routing prefix based on a value of the Prefix List field in FIG. 25.

When the security state information of the network device includes that origin authentication is not enabled for the BGP session, a possibility that the network device is attacked is high, and the first device may send an enable instruction to the network device, where the enable instruction is used to instruct the network device to enable origin authentication.

When the security state information of the network device includes the quantity of received routing prefixes, the first device may determine whether the quantity of routing prefixes received by the network device is greater than or equal to a threshold. If yes, it indicates that the network device is in a heavy-load running state, some services may fail to run normally, and the first device may give an early warning or adjust a service flow of the network device. For example, in FIG. 27, when a value of the Current Prefix Number Per Router field is greater than or equal to a product of a value of the Allowed Max Prefix Number Per Router field and a value of the Threshold field, the first device may give an early warning or adjust the service flow of the network device.

When the security state information of the network device includes the quantity of received routing prefixes corresponding to the address family information, the first device may determine whether the quantity of received routing prefixes corresponding to the address family information is greater than or equal to a threshold. If yes, it indicates that the network device is in a heavy-load running state, some services may fail to run normally, and the first device may give an early warning or further determine whether a routing prefix corresponding to the address family information is valid. If yes, the first device increases the maximum value of routing prefixes allowed to be received, and sends the adjusted value to the network device. For example, in FIG. 28, when a value of the Current Max Prefix Number Per Peer Per AFI/SAFI field is greater than or equal to a product of a value of the Allowed Max Prefix Number Per Peer Per AFI/SAFI field and a value of the Threshold field, the first device may perform the foregoing operations.

When the security state information of the network device includes the address family information for which no routing prefix threshold is set, the network device may be subject to a risk of running in overload because a large quantity of routing prefixes are received. The first device may deliver a setting instruction, where the setting instruction is used by the network device to set the routing prefix threshold for the address family. In this way, the network device may give an early warning. For example, in FIG. 29, if the value of the Direction field is 1, the setting instruction delivered by the first device may be used by the network device to set the routing prefix threshold for the address family in the packet output direction. If the value of the Direction field is 0, the setting instruction delivered by the first device may be used by the network device to set the routing prefix threshold for the address family in the packet input direction. If the value of the Direction field is 2, the setting instruction delivered by the first device may be used by the network device to set the routing prefix threshold for the address family in the packet output direction and the packet input direction.

When the security state information of the network device includes that the error update message ignore function is enabled, there may be a risk that the routing information of the network device is not synchronized with routing information of the peer. The first device may obtain an error update message and analyze the error update message. When the security state information of the network device includes that the error update message ignore function is disabled, the network device terminates the BGP session with the peer, possibly causing a risk of network flapping. The first device may send an enable instruction to the network device, where the enable instruction is used to instruct the network device to enable the error update message ignore function, or the first device may perform a protection measure against network flapping.

When the security state information of the network device includes whether the error update message ignore function corresponding to the address family information is enabled, an action performed by the first device is similar to an action performed when the security state information of the network device includes that the error update message ignore function is enabled. Details are not described herein again.

When the security state information of the network device includes that the function of checking the first autonomous system AS number of the autonomous system path AS_Path attribute in the update message sent by the EBGP peer to the network device is not enabled, the first device may determine whether all peers of the network device are route servers (Route Server), and if no, may send an enable instruction to the network device, where the enable instruction is used to enable the function of checking the first autonomous system AS number of the autonomous system path AS_Path attribute in the update message sent by the EBGP peer to the network device.

When the security state information of the network device includes that the function of checking the first AS number of the AS_Path list in the update message sent by the first EBGP peer is not enabled for the first EBGP peer, the first device may determine whether the EBGP peer is a route server, and if no, may send an enable instruction to the network device, where the enable instruction is used to enable the function of checking the first autonomous system AS number of the autonomous system path AS_Path attribute in the update message sent by the EBGP peer to the network device. The first EBGP peer is any one of all EBGP peers of the network device.

When the security state information of the network device includes that the local AS number is allowed to repeatedly appear for a plurality of times, the first device may determine whether the network device and the peer belong to a same network provider. If no, a risk that a routing loop occurs on the network device is high, and the first device may send a disable instruction to the network device, where the disable instruction is used to instruct the network device to disable the function of allowing the local AS number to repeatedly appear for a plurality of times.

When the security state information of the network device includes that no corresponding inbound policy is configured for the address family, the first device may determine whether the network device and the peer belong to a same network provider. If no, a possibility that the network device receives an invalid route is high, and the first device may send a configuration instruction to the network device, where the configuration instruction is used to instruct the network device to configure an inbound policy for the address family. For example, in FIG. 35, when the value of the Sub-Type field indicates that the Sub-TLV is a BGP No Inbound-Policy Sub-TLV, the first device may send a configuration instruction to the network device, where the configuration instruction is used to instruct the network device to configure an inbound policy for address family information corresponding to the AFI field and the SAFI field.

When the security state information of the network device includes that no corresponding outbound policy is configured for the address family, the first device may determine whether the network device and the peer belong to the same network provider. If no, a possibility that the network is affected is high, and the first device may send a configuration instruction to the network device, where the configuration instruction is used to instruct the network device to configure an outbound policy for the address family. For example, in FIG. 36, when the value of the Sub-Type field indicates that the Sub-TLV is a BGP No Outbound-Policy Sub-TLV, the first device may send a configuration instruction to the network device, where the configuration instruction is used to instruct the network device to configure an outbound policy for the address family information corresponding to the AFI field and the SAFI field.

When the security state information of the network device includes that secure socket layer SSL authentication is enabled, it indicates that security of the BGP session of the network device is high. When the first device receives different BGP sessions that carry a same routing prefix, the first device preferentially uses a BGP session of a network device that enables SSL authentication.

It may be understood that the foregoing manner of processing the security state information does not constitute a limitation on this application. Persons skilled in the art may design the processing manner at discretion based on a specific situation.

Figure 38:
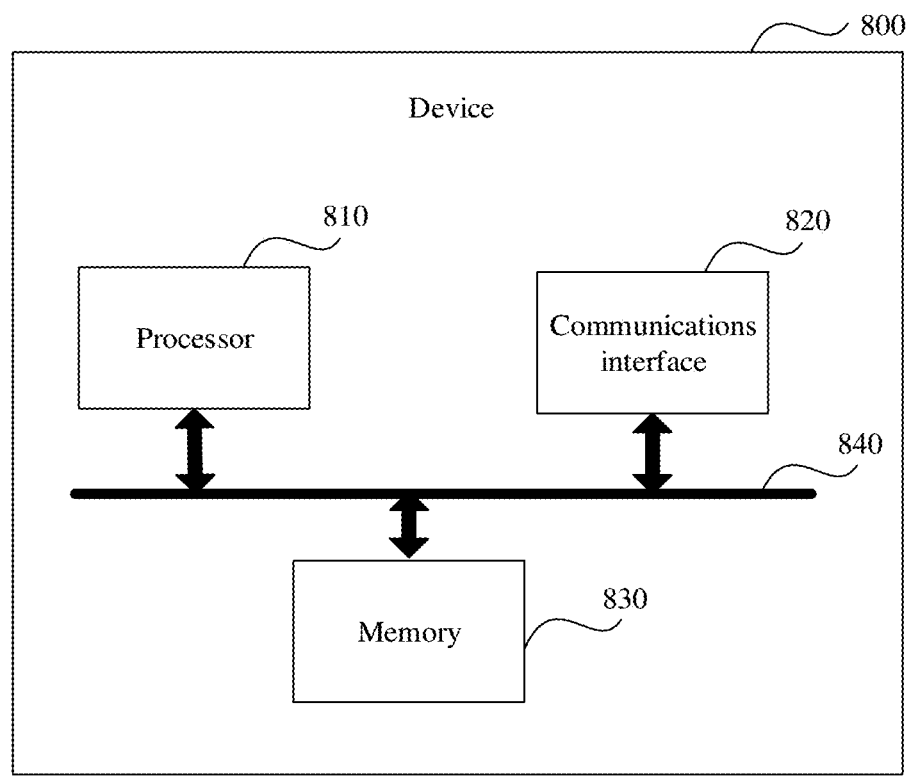
FIG. 38 is a schematic diagram of a structure of a network device according to an embodiment of this application.

Correspondingly, refer to FIG. 38. An embodiment of this application further provides a network device 800. The network device 800 may implement functions of the network device in the embodiment shown in FIG. 2. The network device 800 includes a memory 830, a processor 810, and a communications interface 820.

The memory 801 is configured to store a computer program or computer instructions.

The processor 802 is configured to invoke the computer program or the computer instructions stored in the memory, so that the network management device performs the information reporting method performed by the network device in the embodiment shown in FIG. 2.

The communications interface 803 is configured to communicate with a first device.

The memory 801, the processor 802, and the communications interface 803 are mutually connected through a bus 804. The bus 804 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 8, but this does not mean that there is only one bus or only one type of bus.

In a specific embodiment, the processor 802 is configured to obtain BGP information, and add the BGP information to a BMP notification message. For a detailed processing procedure of the processor 801, refer to S102 in the embodiment shown in FIG. 2. Details are not described herein again.

The communications interface 803 is configured to send the BMP message to the first device. For a specific process, refer to S102 in the embodiment shown in FIG. 2. Details are not described herein again.

Figure 39:
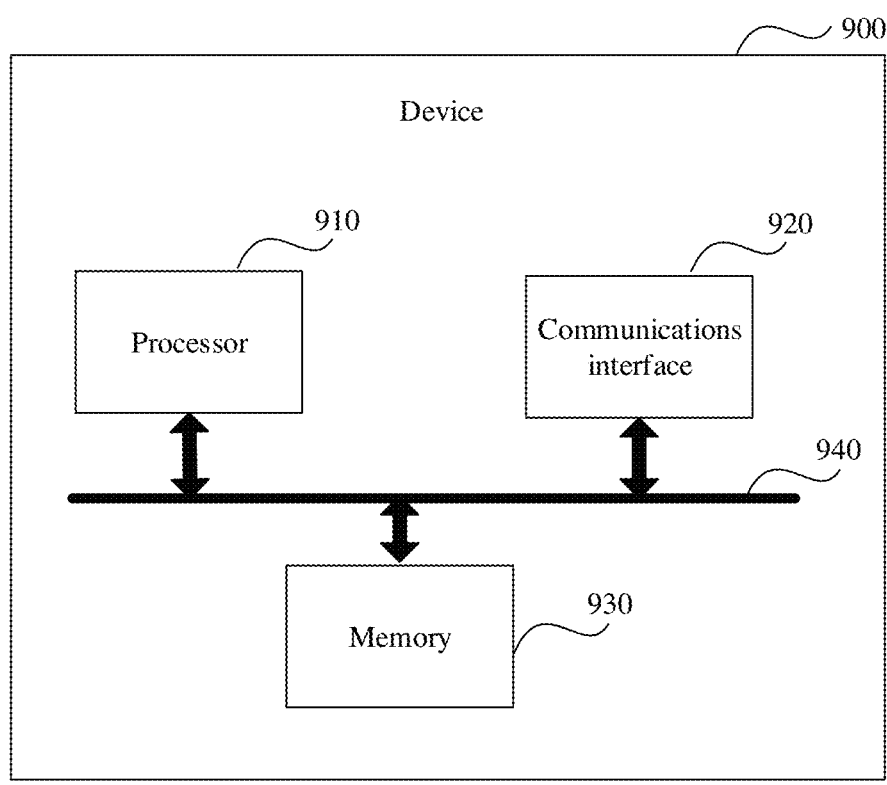
FIG. 39 is a schematic diagram of a structure of a network management device according to an embodiment of this application.

Correspondingly, refer to FIG. 39. An embodiment of this application provides a network management device 900. The network management device 900 may implement functions of the first device in the embodiment shown in FIG. 2. The network management device 900 includes a memory 901, a processor 902, and a communications interface 903.

The memory 901 is configured to store a computer program or computer instructions.

The processor 902 is configured to invoke the computer program or the computer instructions stored in the memory, so that the network management device performs the information processing method of the first device in the embodiment shown in FIG. 2.

The communications interface 803 is configured to communicate with a network device.

The memory 901, the processor 902, and the communications interface 903 are mutually connected through a bus 904. The bus 904 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 9, but this does not mean that there is only one bus or only one type of bus.

In a specific embodiment, the communications interface 903 is configured to receive a BMP notification message from the network device. For a specific process, refer to the detailed description of S1*o*3 in the embodiment shown in FIG. 2. Details are not described herein again.

The processor 901 is configured to obtain BGP information from the BMP notification message, and perform corresponding processing based on the BGP information. For a detailed processing procedure of the processor 901, refer to the detailed description of S104 in the embodiment shown in FIG. 2. Details are not described herein again.

The memory 801 and the memory 901 each may be a random access memory (random access memory, RAM), a flash memory (flash), a read-only memory (ROM), an erasable programmable read-only memory (EPROM), an electrically erasable programmable read-only memory (EEPROM), a register, a hard disk, a removable hard disk, a CD-ROM, or any other form of storage medium known to persons skilled in the art.

The processor 802 and the processor 902 each may be, for example, a central processing unit (CPU), a general-purpose processor, a digital signal processor (DSP), an application-specific integrated circuit (ASIC), a programmable gate array (FPGA) or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors or a combination of a DSP and a microprocessor.

The communications interface 803 and the communications interface 903 may be, for example, an interface card, and may be an Ethernet interface or asynchronous transfer mode (ATM) interface.

An embodiment of this application further provides a monitoring system, including the network device 800 and the network management device 900.

An embodiment of this application provides a computer-readable storage medium, including instructions. When the instructions are run on a computer, the computer is enabled to perform the foregoing information reporting method and information processing method.

An embodiment of this application further provides a chip. The chip is disposed in a network device. The chip includes a processor and an interface circuit.

The interface circuit is configured to: receive code instructions and transmit the code instructions to the processor.

The processor is configured to run the code instructions to perform the foregoing information reporting method applied to the network device in the embodiment shown in FIG. 2.

In a specific embodiment, the processor is configured to obtain BGP information of the network device, and send a BMP notification message to a first device, where the BMP notification message carries the BGP information of the network device. For a detailed processing procedure of the processor, refer to S101 and S102 in the embodiment shown in FIG. 2. Details are not described herein again.

An embodiment of this application further provides a chip. The chip is disposed in a network management device. The chip includes a processor and an interface circuit.

The interface circuit is configured to: receive code instructions and transmit the code instructions to the processor.

The processor is configured to run the code instructions to perform the foregoing information processing method applied to the first device in the embodiment shown in FIG. 2.

In a specific embodiment, the processor is configured to obtain a BMP notification message from a network device, where the BMP notification message includes BGP information of the network device, and perform corresponding processing based on the BGP information of the network device. For a detailed processing procedure of the processor, refer to S103 and S104 in the embodiment shown in FIG. 2. Details are not described herein again.

In this application, "at least one" means one or more, and "a plurality of" means two or more. "At least one of the following" or a similar expression thereof refers to any combination of these items, including any combination of singular items (pieces) or plural items (pieces). For example, at least one of a, b, or c may represent: a, b, c, a and b, a and c, b and c, or a, b, and c, where a, b, and c may be singular or plural. In this application, it is considered that "A and/or B" includes only A, only B, and both A and B.

In this specification, the claims, and the accompanying drawings of this application, terms "first", "second", "third", "fourth", and the like (if existent) are intended to distinguish between similar objects but do not necessarily indicate a specific order or sequence. It should be understood that data used in such a way is interchangeable in proper circumstances, so that embodiments described herein can be implemented in orders other than the order illustrated or described herein. In addition, the terms "include", "have", and any other variants mean to cover the non-exclusive inclusion, for example, a process, method, system, product, or device that includes a list of steps or units is not necessarily limited to those steps or units, but may include other steps or units that are not expressly listed or inherent to such a process, method, product, or device.

It may be clearly understood by persons skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, the apparatus, and the method may be implemented in other manners. For example, the described apparatus embodiments are merely examples. For example, division into the units is merely logical module division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be obtained based on an actual requirement to implement the objectives of the solutions of embodiments.

In addition, module units in embodiments of this application may be integrated into one processing unit. Alternatively, each of the units may exist alone physically, or two or more units may be integrated into one unit. The integrated unit may be implemented in a form of hardware, or may be implemented in a form of a software module unit.

When the integrated unit is implemented in a form of a software module unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

Persons skilled in the art should be aware that in the foregoing one or more examples, functions described in the present invention may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

In the foregoing specific implementations, the objectives, technical solutions, and beneficial effects of the present invention are further described in detail. It should be understood that the foregoing descriptions are merely specific implementations of the present invention.

In conclusion, the foregoing embodiments are merely intended for describing the technical solutions of this application, but are not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A method comprising:
obtaining, by a network device, Border Gateway Protocol (BGP) information of the network device; and
sending, by the network device, a BGP Monitoring Protocol (BMP) notification message to a first device, wherein the BMP notification message carries the BGP information of the network device, and wherein the BGP information of the network device comprises health status information of the network device or security state information of the network device, the health status information of the network device indicating a health status of the network device, and the security state information of the network device indicating a security state of the network device; and
wherein the health status information of the network device comprises one or more of following:
message backlog information of a message queue of the network device or information about a slow peer corresponding to first address family information configured by the network device, wherein the message backlog information indicates a message backlog in the message queue.

2. The method according to claim 1, wherein the BGP information of the network device further comprises second address family information and a first indication, and the first indication indicates whether monitoring is enabled for an address family corresponding to the second address family information.

3. The method according to claim 2, wherein the BGP information of the network device further comprises a configuration state corresponding to the second address family information, and the configuration state is a state about whether the network device or a peer of the network device has configured the second address family information.

4. The method according to claim 3, wherein the configuration state is a first configuration state, a second configuration state, or a third configuration state; and
wherein:
the first configuration state indicates that both the network device and the peer of the network device have configured the second address family information;
the second configuration state indicates that the network device has configured the address family information, and that the peer of the network device has not configured the second address family information; and
the third configuration state indicates that the network device has not configured the second address family information.

5. The method according to claim 2, wherein the BGP information of the network device further comprises a routing information type corresponding to the second address family information.

6. The method according to claim 5, wherein the routing information type comprises pre-policy routing information or post-policy routing information.

7. The method according to claim 1, wherein the BGP information of the network device further comprises resource information of the network device.

8. The method according to claim 7, wherein the resource information of the network device comprises one or more of following:
- a quantity of BGP sessions used by the network device or a total quantity of BGP sessions supported by the network device;
- a quantity of BGP instances used by the network device or a total quantity of BGP instances supported by the network device;
- a quantity of BGP routing entries used by the network device or a total quantity of BGP routing entries supported by the network device;
- a quantity of routing entries corresponding to the first address family information configured by the network device;
- a quantity of forwarding entries in the network device or a total quantity of forwarding entries supported by the network device;
- a quantity of forwarding entries corresponding to the first address family information configured by the network device;
- a memory size used by the network device or a total memory size of the network device; or
- a used memory size corresponding to the first address family information configured by the network device.

9. The method according to claim 1, wherein the message backlog information comprises a quantity of messages in the message queue or a maximum quantity of messages allowed by the message queue.

10. A method comprising:
- receiving, by a first device, a Border Gateway Protocol Monitoring Protocol (BMP) notification message from a network device, wherein the BMP notification message comprises Border Gateway Protocol (BGP) information of the network device, and wherein the BGP information of the network device comprises health status information of the network device or security state information of the network device, the health status information of the network device indicating a health status of the network device, and the security state information of the network device indicating a security state of the network device; and
- performing, by the first device, corresponding processing based on the BGP information of the network device; and
- wherein the health status information of the network device comprises one or more of following:
  - message backlog information of a message queue of the network device or information about a slow peer corresponding to first address family information configured by the network device, wherein the message backlog information indicates a message backlog in the message queue.

11. The method according to claim 10, wherein the BGP information of the network device further comprises second address family information and a first indication, and the first indication indicates whether monitoring is enabled for an address family corresponding to the second address family information.

12. A network device, comprising:
- at least one processor; and
- one or more memories coupled to the at least one processor and configured to store instructions for execution by the at least one processor, wherein the instructions instruct the at least one processor to cause the network device to:
- obtain Border Gateway Protocol (BGP) information of the network device, wherein the BGP information of the network device comprises health status information of the network device or security state information of the network device, the health status information indicating a health status of the network device, and the security state information indicating a security state of the network device; and
- send a BGP Monitoring Protocol (BMP) notification message to a first device, wherein the BMP notification message carries the BGP information of the network device; and
- wherein the health status information of the network device comprises one or more of following:
- message backlog information of a message queue of the network device or information about a slow peer corresponding to address family information configured by the network device, and wherein the message backlog information indicates a message backlog in the message queue.

13. The network device according to claim 12, wherein the BGP information of the network device further comprises second address family information and a first indication, and the first indication indicates whether monitoring is enabled for an address family corresponding to the second address family information.

14. A network management device, comprising:
- at least one processor; and
- one or more memories coupled to the at least one processor and configured to store instructions for execution by the at least one processor, wherein the instructions instruct the at least one processor to cause the network management device to:
- receive, a Border Gateway Protocol Monitoring Protocol (BMP) notification message from a network device, wherein the BMP notification message comprises Border Gateway Protocol (BGP) information of the network device, and wherein the BGP information of the network device comprises health status information of the network device or security state information of the network device, the health status information indicating a health status of the network device, and the security state information indicating a security state of the network device; and
- perform corresponding processing based on the BGP information of the network device; and
- wherein the health status information of the network device comprises one or more of following:
- message backlog information of a message queue of the network device or information about a slow peer corresponding to address family information configured by the network device, and wherein the message backlog information indicates a message backlog in the message queue.

15. The network management device according to claim 14, wherein the BGP information of the network device further comprises a configuration state corresponding to second address family information comprised in the BGP information, and the configuration state is a state about whether the network device or a peer of the network device has configured the second address family information.

16. The method according to claim 1, wherein the security state information of the network device comprises at least one or more of the following:
- whether a generalized time to live security mechanism (GTSM) is enabled for a BGP session of the network device, wherein when the GTSM is enabled for the BGP session of the network device, the security state information of the network device further comprises a valid time to live (TTL) hop count;
- whether security authentication is enabled for the BGP session of the network device, wherein when security authentication is enabled for the BGP session of the network device, the security state information of the network device further comprises an authentication mode, an authentication algorithm, or an authentication result of the security authentication;
- whether origin authentication is enabled for the BGP session of the network device, wherein when origin authentication is enabled for the BGP session of the network device, the security state information of the network device further comprises invalid routing prefix information;
- a quantity of routing prefixes received by the network device or a threshold for routing prefixes allowed to be received by the network device;
- a quantity of routing prefixes corresponding to second address family information or a routing prefix threshold corresponding to the second address family information;
- second address family information of the network device for which no routing prefix threshold is set;
- whether the network device enables an error update message ignore function;
- whether the network device enables an error update message ignore function corresponding to the address family information;
- whether the network device enables a function of checking a first autonomous system (AS) number of an autonomous system path (AS_Path) attribute in an update message sent by an external BGP (EBGP) peer to the network device;
- whether the network device allows a local autonomous system number to repeatedly appear for a plurality of times;
- whether the network device configures a corresponding inbound policy or outbound policy for an address family; or
- whether the network device enables secure socket layer (SSL) authentication.

17. The method according to claim 10, wherein the security state information of the network device comprises at least one or more of the following:
- whether a generalized time to live security mechanism (GTSM) is enabled for a BGP session of the network device, wherein when the GTSM is enabled for the BGP session of the network device, the security state information of the network device further comprises a valid time to live (TTL) hop count;
- whether security authentication is enabled for the BGP session of the network device, wherein when security authentication is enabled for the BGP session of the network device, the security state information of the network device further comprises an authentication mode, an authentication algorithm, or an authentication result of the security authentication;
- whether origin authentication is enabled for the BGP session of the network device, wherein when origin authentication is enabled for the BGP session of the network device, the security state information of the network device further comprises invalid routing prefix information;
- a quantity of routing prefixes received by the network device or a threshold for routing prefixes allowed to be received by the network device;
- a quantity of routing prefixes corresponding to second address family information or a routing prefix threshold corresponding to the second address family information;
- address family information of the network device for which no routing prefix threshold is set;
- whether the network device enables an error update message ignore function;
- whether the network device enables an error update message ignore function corresponding to the second address family information;
- whether the network device enables a function of checking a first autonomous system (AS) number of an autonomous system path (AS_Path) attribute in an update message sent by an external BGP (EBGP) peer to the network device;
- whether the network device allows a local autonomous system number to repeatedly appear for a plurality of times;
- whether the network device configures a corresponding inbound policy or outbound policy for an address family; or
- whether the network device enables secure socket layer (SSL) authentication.

18. The network device according to claim 12, wherein the security state information of the network device comprises at least one or more of the following:
- whether a generalized time to live security mechanism (GTSM) is enabled for a BGP session of the network device, wherein when the GTSM is enabled for the BGP session of the network device, the security state information of the network device further comprises a valid time to live (TTL) hop count;
- whether security authentication is enabled for the BGP session of the network device, wherein when security authentication is enabled for the BGP session of the network device, the security state information of the network device further comprises an authentication mode, an authentication algorithm, or an authentication result of the security authentication;
- whether origin authentication is enabled for the BGP session of the network device, wherein when origin authentication is enabled for the BGP session of the network device, the security state information of the network device further comprises invalid routing prefix information;
- a quantity of routing prefixes received by the network device or a threshold for routing prefixes allowed to be received by the network device;
- a quantity of routing prefixes corresponding to second address family information or a routing prefix threshold corresponding to the second address family information;
- address family information of the network device for which no routing prefix threshold is set;
- whether the network device enables an error update message ignore function;
- whether the network device enables an error update message ignore function corresponding to the address family information;

whether the network device enables a function of checking a first autonomous system (AS) number of an autonomous system path (AS_Path) attribute in an update message sent by an external BGP (EBGP) peer to the network device;

whether the network device allows a local autonomous system number to repeatedly appear for a plurality of times;

whether the network device configures a corresponding inbound policy or outbound policy for an address family; or whether the network device enables secure socket layer (SSL) authentication.

19. The network device according to claim 14, wherein the security state information of the network device comprises at least one or more of the following:

whether a generalized time to live security mechanism (GTSM) is enabled for a BGP session of the network device, wherein when the GTSM is enabled for the BGP session of the network device, the security state information of the network device further comprises a valid time to live (TTL) hop count;

whether security authentication is enabled for the BGP session of the network device, wherein when security authentication is enabled for the BGP session of the network device, the security state information of the network device further comprises an authentication mode, an authentication algorithm, or an authentication result of the security authentication;

whether origin authentication is enabled for the BGP session of the network device, wherein when origin authentication is enabled for the BGP session of the network device, the security state information of the network device further comprises invalid routing prefix information;

a quantity of routing prefixes received by the network device or a threshold for routing prefixes allowed to be received by the network device;

a quantity of routing prefixes corresponding to second address family information or a routing prefix threshold corresponding to the second address family information;

address family information of the network device for which no routing prefix threshold is set;

whether the network device enables an error update message ignore function;

whether the network device enables an error update message ignore function corresponding to the address family information;

whether the network device enables a function of checking a first autonomous system (AS) number of an autonomous system path (AS_Path) attribute in an update message sent by an external BGP (EBGP) peer to the network device;

whether the network device allows a local autonomous system number to repeatedly appear for a plurality of times;

whether the network device configures a corresponding inbound policy and/or outbound policy for an address family; or whether the network device enables secure socket layer (SSL) authentication.

* * * * *